(12) United States Patent
Pang et al.

(10) Patent No.: US 10,321,514 B2
(45) Date of Patent: *Jun. 11, 2019

(54) ACKNOWLEDGMENT PACKET SENDING METHOD AND DEVICE

(71) Applicant: Huawei Technologies Co., Ltd., Shenzhen, Guangdong (CN)

(72) Inventors: Lingli Pang, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,824

(22) Filed: Jan. 11, 2018

(65) Prior Publication Data

US 2018/0132306 A1 May 10, 2018

Related U.S. Application Data

(63) Continuation of application No. 14/944,760, filed on Nov. 18, 2015, now Pat. No. 9,907,112, which is a
(Continued)

(51) Int. Cl.
*H04W 80/02* (2009.01)
*H04W 80/06* (2009.01)
(Continued)

(52) U.S. Cl.
CPC ........... *H04W 80/06* (2013.01); *H04L 1/1854* (2013.01); *H04L 69/163* (2013.01);
(Continued)

(58) Field of Classification Search
CPC .... H04W 80/04; H04W 80/06; H04L 69/321; H04L 1/1854
See application file for complete search history.

(56) References Cited

U.S. PATENT DOCUMENTS 6,463,055 B1 10/2002 Lupien et al.
2004/0184437 A1 9/2004 Lee et al.
(Continued)

FOREIGN PATENT DOCUMENTS

CN 101267582 A 9/2008
CN 101534573 A 9/2009
(Continued)

OTHER PUBLICATIONS

"3rd Generation Partnership Project; Technical Specification Group Radio Access Network; Radio Link Control (RLC) protocol specification (Release 11)", 3GPP TS 25.322 V11.2.0, Mar. 2013, 90 pages.

*Primary Examiner* — Asad M Nawaz
*Assistant Examiner* — Syed Ali

(57) ABSTRACT

An acknowledgment packet sending method and device are provided, so as to reduce sending of acknowledgment packets on an air interface, and improve efficiency of air interface resource utilization. After receiving a TCP acknowledgment packet that is sent by a TCP protocol entity unit of a communications device and does not carry data information, an RLC protocol entity unit of the communications device discards the received TCP acknowledgment packet; or determines, according to a sending status of an RLC acknowledgment packet, whether to send a TCP acknowledgment packet to a peer communications device, and performs corresponding processing according to a result of the determining.

20 Claims, 11 Drawing Sheets

Related U.S. Application Data continuation of application No. PCT/CN2013/075939, filed on May 20, 2013.

(51) Int. Cl.
*H04W 80/04* (2009.01)
*H04L 29/08* (2006.01)
*H04L 29/06* (2006.01)
*H04L 1/18* (2006.01)

(52) U.S. Cl.
CPC ........... *H04L 69/321* (2013.01); *H04W 80/04* (2013.01); *H04W 80/02* (2013.01)

(56) References Cited

U.S. PATENT DOCUMENTS

| | | | |
|---|---|---|---|
| 2008/0227442 A1* | 9/2008 | Pani | H04L 1/1877 455/422.1 |
| 2009/0046656 A1* | 2/2009 | Kitazoe | H04W 36/0055 370/331 |
| 2009/0103478 A1 | 4/2009 | Sammour et al. | |
| 2009/0104890 A1* | 4/2009 | Wang | H04W 12/02 455/410 |
| 2009/0201813 A1 | 8/2009 | Speight | |
| 2010/0118781 A1 | 5/2010 | Petrovic et al. | |
| 2010/0135202 A1 | 6/2010 | Chun et al. | |
| 2011/0158186 A1 | 6/2011 | Shihab | |
| 2011/0188481 A1* | 8/2011 | Damnjanovic | H04W 72/04 370/336 |
| 2012/0033579 A1 | 2/2012 | Liao et al. | |
| 2012/0082096 A1* | 4/2012 | Cave | H04L 1/1841 370/328 |
| 2012/0278502 A1 | 11/2012 | Speight et al. | |
| 2013/0070682 A1 | 3/2013 | Kim et al. | |
| 2013/0088983 A1 | 4/2013 | Pragada et al. | |
| 2014/0050096 A1 | 2/2014 | Cui et al. | |
| 2014/0362770 A1* | 12/2014 | Jonsson | H04W 80/02 370/328 |
| 2015/0043435 A1 | 2/2015 | Blankenship et al. | |
| 2015/0085749 A1* | 3/2015 | Eravelli | H04L 69/24 370/328 |
| 2015/0173118 A1* | 6/2015 | Gholmieh | H04W 76/10 455/436 |
| 2015/0289165 A1 | 10/2015 | Reider et al. | |
| 2016/0192354 A1* | 6/2016 | Wei | H04L 1/1812 370/329 |
| 2016/0234714 A1 | 8/2016 | Basu Mallick et al. | |
| 2017/0094560 A1* | 3/2017 | Pani | H04L 47/10 |

FOREIGN PATENT DOCUMENTS

| | | |
|---|---|---|
| CN | 102007812 A | 4/2011 |
| CN | 102017505 A | 4/2011 |
| CN | 102761905 A | 10/2012 |
| EP | 1361721 A1 | 11/2003 |
| EP | 2696621 A1 | 2/2014 |
| WO | 2012146189 A1 | 11/2012 |

* cited by examiner

ACKNOWLEDGMENT PACKET SENDING METHOD AND DEVICE

CROSS-REFERENCE TO RELATED APPLICATIONS

This application is a continuation of U.S. application Ser. No. 14/944,760, filed on Nov. 18, 2015, which is a continuation of International Application No. PCT/CN2013/075939, filed on May 20, 2013. All of the afore-mentioned patent applications are hereby incorporated by reference in their entireties.

TECHNICAL FIELD

The present invention relates to the field of wireless communications technologies, and in particular, to an acknowledgment packet sending method and device.

BACKGROUND

In a process of transmitting data in a wireless manner, a network-side device and a user-side device generally follow a hierarchical model for data transmission, that is, an application layer, a transfer control protocol (Transfer Control Protocol, TCP) layer, a network layer, a radio link control (Radio link Control, RLC) layer, a MAC (Media Access Control, Media Access Control) layer, and a physical (Physical, PHY) layer. When the network-side device sends data to the user-side device, the data starts from an application layer of the network-side device, after passing through a transfer control protocol layer, a network layer, a Radio Link Control layer, a media access control layer, and a physical layer of the network-side device, arrives at a physical layer of the user-side device through a transmission link, passes through a Radio Link Control layer and a network layer of the user-side device, and finally, arrives at an application layer of the user-side device; and vice versa.

To avoid a case in which a data loss or a data error occurs in a data transmission process, a receive data acknowledgment mechanism is introduced into the foregoing data transmission process, where an acknowledgment at the TCP layer is to ensure correctness of transmitting a data packet at the TCP layer, and an acknowledgment at the RLC layer is to ensure correctness of receiving a data packet at the RLC layer. In a condition provided with acknowledgments at both the RLC layer and the TCP layer, a data packet transmission procedure is shown in FIG. 1.

Currently, a TCP acknowledgment packet (TCP ACK; ACK: Acknowledgment, acknowledgment) is sent in two manners: piggybacked (that is, sent together with a data packet) and independently sent (that is, data is not included in the TCP acknowledgment packet, and only header information is included). A format of a TCP data packet header is shown in FIG. 2, where a 4-bit (bit) header length indicates a quantity of pieces of 32-bit information that appears in a TCP packet header. A TCP packet header is a maximum of 60 bytes (byte), and is generally 20 bytes.

During one time of data packet transmission, an RLC-AM mode (that is, an RLC acknowledged mode; AM: Acknowledged Mode, acknowledged mode) is used, where both an RLC layer and a TCP layer at a receive end device may send an acknowledgment packet, and receiving of a TCP acknowledgment packet may trigger sending of an RLC acknowledgment packet again. During transmission of a single data packet, particularly, transmission of a single small data packet, one data packet at the foregoing application layer is corresponding to a maximum of three acknowledgment packets on an air interface (Air Interface, air interface, that is, an interface between a mobile terminal and a base station). When an independent TCP acknowledgment packet appears, a data packet is relatively large, which causes a waste of air interface resources, and a large quantity of acknowledgment packets cause interference to other communication data.

SUMMARY

Embodiments of the present invention provide an acknowledgment packet sending method and device, so as to reduce sending of acknowledgment packets on an air interface, and improve efficiency of air interface resource utilization.

According to a first aspect, an acknowledgment packet sending method is provided, and the method includes: discarding, by an RLC protocol entity unit of a communications device after receiving a TCP acknowledgment packet that is sent by a TCP protocol entity unit of the communications device and does not carry data information, the received TCP acknowledgment packet; or determining, according to a sending status of an RLC acknowledgment packet, whether to send a TCP acknowledgment packet to a peer communications device, and performing corresponding processing according to a result of the determining; and sending, by the RLC protocol entity unit of the communications device after receiving an RLC acknowledgment packet sent by the peer communications device, a TCP acknowledgment packet to the TCP protocol entity unit of the communications device according to the received RLC acknowledgment packet if it is determined, according to the received RLC acknowledgment packet, that a TCP acknowledgment packet needs to be sent.

With reference to the first aspect, in a first possible implementation manner, after the discarding, by an RLC protocol entity unit of a communications device after receiving a TCP acknowledgment packet that is sent by a TCP protocol entity unit of the communications device and does not carry data information, the received TCP acknowledgment packet, the method further includes: sending, by the RLC protocol entity unit of the communications device, an RLC acknowledgment packet to the peer communications device.

With reference to the first aspect, in a second possible implementation manner, the determining, according to a sending status of an RLC acknowledgment packet, whether to send a TCP acknowledgment packet to a peer communications device, and performing corresponding processing according to a result of the determining specifically includes: if a current moment is a sending occasion of an RLC acknowledgment packet, determining not to send a TCP acknowledgment packet to the peer communications device, adding TCP acknowledgment information in a currently received TCP acknowledgment packet to an RLC acknowledgment packet whose sending occasion is the current moment, and sending, to the peer communications device, an RLC acknowledgment packet to which the TCP acknowledgment information is added; or if a current moment is not a sending occasion of an RLC acknowledgment packet, determining to send a TCP acknowledgment packet to the peer communications device, and sending, to the peer communications device, a currently received TCP acknowledgment packet or a TCP acknowledgment packet that is obtained after information deletion is performed on the received TCP acknowledgment packet.

With reference to the second possible implementation manner of the first aspect, in a third possible implementation manner, the sending, by the RLC protocol entity unit of the communications device after receiving an RLC acknowledgment packet sent by the peer communications device, a TCP acknowledgment packet to the TCP protocol entity unit of the communications device according to the received RLC acknowledgment packet if it is determined, according to the received RLC acknowledgment packet, that a TCP acknowledgment packet needs to be sent specifically includes: determining, by the RLC protocol entity unit of the communications device after receiving an RLC acknowledgment packet that is sent by an RLC protocol entity unit of the peer communications device and carries TCP acknowledgment information, that a TCP acknowledgment packet needs to be sent, and sending a TCP acknowledgment packet to the TCP protocol entity unit of the communications device according to the TCP acknowledgment information carried in the received RLC acknowledgment packet.

With reference to the first aspect, in a fourth possible implementation manner, the determining, according to a sending status of an RLC acknowledgment packet, whether to send a TCP acknowledgment packet to a peer communications device, and performing corresponding processing according to a result of the determining specifically includes: discarding a currently received TCP acknowledgment packet if it is acknowledged, according to the received TCP acknowledgment packet, that a corresponding RLC acknowledgment packet is sent; or sending a currently received TCP acknowledgment packet to the peer communications device if it is acknowledged, according to the received TCP acknowledgment packet, that a corresponding RLC acknowledgment packet is not sent.

With reference to the fourth possible implementation manner of the first aspect, in a fifth possible implementation manner, the method further includes: if the RLC protocol entity unit of the communications device acknowledges that an RLC acknowledgment packet that is not sent exists in acknowledgment packets of all RLC data packets corresponding to the received TCP acknowledgment packet, skipping sending the RLC acknowledgment packet that is not sent, sending the received TCP acknowledgment packet to the peer communications device, and determining a next RLC acknowledgment packet according to a sequence number of an RLC data packet corresponding to the currently sent TCP acknowledgment packet.

With reference to the first aspect, in a sixth possible implementation manner, the determining, according to a sending status of an RLC acknowledgment packet, whether to send a TCP acknowledgment packet to a peer communications device, and performing corresponding processing according to a result of the determining specifically includes: when a sending occasion of an RLC acknowledgment packet arrives, if the TCP acknowledgment packet that is received from the TCP protocol entity unit of the communications device and does not carry data information is currently buffered, determining, by the RLC protocol entity unit of the communications device, not to send a TCP acknowledgment packet to the peer communications device, adding TCP acknowledgment information in the buffered TCP acknowledgment packet to an RLC acknowledgment packet that needs to be sent at a current moment, and sending, to the peer communications device, an RLC acknowledgment packet to which the TCP acknowledgment information is added.

According to a second aspect, a communications device is provided, including a TCP protocol entity unit and an RLC protocol entity unit, where: the TCP protocol entity unit is configured to: send a TCP acknowledgment packet to the RLC protocol entity unit, where the TCP acknowledgment packet is used to acknowledge that a TCP data packet sent by a peer communications device is received; and receive a TCP acknowledgment packet sent by the RLC protocol entity unit, where the TCP acknowledgment packet indicates that the peer communications device acknowledges that a corresponding TCP data packet is received; and the RLC protocol entity unit is configured to: discard, after receiving a TCP acknowledgment packet that is sent by the TCP protocol entity unit and does not carry data information, the received TCP acknowledgment packet; or determine, according to a sending status of an RLC acknowledgment packet, whether to send a TCP acknowledgment packet to the peer communications device, and perform corresponding processing according to a result of the determining; and send, after receiving an RLC acknowledgment packet sent by the peer communications device, a TCP acknowledgment packet to the TCP protocol entity unit according to the received RLC acknowledgment packet if it is determined, according to the received RLC acknowledgment packet, that a TCP acknowledgment packet needs to be sent.

With reference to the second aspect, in a first possible implementation manner, specifically, the RLC protocol entity unit is further configured to send an RLC acknowledgment packet to the peer communications device after receiving the TCP acknowledgment packet that is sent by the TCP protocol entity unit and does not carry data information and discarding the received TCP acknowledgment packet.

With reference to the second aspect, in a second possible implementation manner, the RLC protocol entity unit is specifically configured to: if a current moment is a sending occasion of an RLC acknowledgment packet, determine not to send a TCP acknowledgment packet to the peer communications device, add TCP acknowledgment information in a currently received TCP acknowledgment packet to an RLC acknowledgment packet whose sending occasion is the current moment, and send, to the peer communications device, an RLC acknowledgment packet to which the TCP acknowledgment information is added; or if a current moment is not a sending occasion of an RLC acknowledgment packet, determine to send a TCP acknowledgment packet to the peer communications device, and send, to the peer communications device, a currently received TCP acknowledgment packet or a TCP acknowledgment packet that is obtained after information deletion is performed on the received TCP acknowledgment packet.

With reference to the second possible implementation manner of the second aspect, in a third possible implementation manner, the RLC protocol entity unit is specifically configured to: determine, after receiving an RLC acknowledgment packet that is sent by an RLC protocol entity unit of the peer communications device and carries TCP acknowledgment information, that a TCP acknowledgment packet needs to be sent, and send a TCP acknowledgment packet to the TCP protocol entity unit according to the TCP acknowledgment information carried in the received RLC acknowledgment packet.

With reference to the second aspect, in a fifth possible implementation manner, the RLC protocol entity unit is specifically configured to: discard a currently received TCP acknowledgment packet if it is acknowledged, according to the received TCP acknowledgment packet, that a corresponding RLC acknowledgment packet is sent; or send a currently received TCP acknowledgment packet to the peer communications device if it is acknowledged, according to the received TCP acknowledgment packet, that a corresponding RLC acknowledgment packet is not sent.

With reference to the fourth possible implementation manner of the second aspect, in a fifth possible implementation manner, the RLC protocol entity unit is further configured to: if it is acknowledged that an RLC acknowledgment packet that is not sent exists in acknowledgment packets of all RLC data packets corresponding to the received TCP acknowledgment packet, skip sending the RLC acknowledgment packet that is not sent, send the received TCP acknowledgment packet to the peer communications device, and determine a next RLC acknowledgment packet according to a sequence number of an RLC data packet corresponding to the currently sent TCP acknowledgment packet.

With reference to the second aspect, in a sixth possible implementation manner, the RLC protocol entity unit is specifically configured to: when a sending occasion of an RLC acknowledgment packet arrives, if the TCP acknowledgment packet that is received from the TCP protocol entity unit and does not carry data information is currently buffered, determine not to send a TCP acknowledgment packet to the peer communications device, add TCP acknowledgment information in the buffered TCP acknowledgment packet to an RLC acknowledgment packet that needs to be sent at a current moment, and send, to the peer communications device, an RLC acknowledgment packet to which the TCP acknowledgment information is added.

According to a third aspect, a communications device is provided, and the communications device includes: an interface module, a memory, and a processor, where the interface module is connected to the processor, and the processor is connected to the memory, where: the interface module is configured to: receive a packet sent by a peer communications device, and send the packet to the processor; or receive a packet sent by the processor, and send the packet to a peer communications device; the memory is configured to store temporary data or intermediate data generated in a process in which the processor performs data processing; and the processor is configured to process transmitted data according to a protocol that is of each layer and defined in a data transmission model, and the processor includes a TCP protocol entity unit and an RLC protocol entity unit, where the TCP protocol entity unit is configured to: send a TCP acknowledgment packet to the RLC protocol entity unit, where the TCP acknowledgment packet is used to acknowledge that a TCP data packet sent by the peer communications device is received; and receive a TCP acknowledgment packet sent by the RLC protocol entity unit, where the TCP acknowledgment packet indicates that the peer communications device acknowledges that a corresponding TCP data packet is received; and the RLC protocol entity unit is configured to: discard, after receiving a TCP acknowledgment packet that is sent by the TCP protocol entity unit and does not carry data information, the received TCP acknowledgment packet; or determine, according to a sending status of an RLC acknowledgment packet, whether to send a TCP acknowledgment packet to the peer communications device, and perform corresponding processing according to a result of the determining; and send, after receiving an RLC acknowledgment packet sent by the peer communications device, a TCP acknowledgment packet to the TCP protocol entity unit according to the received RLC acknowledgment packet if it is determined, according to the received RLC acknowledgment packet, that a TCP acknowledgment packet needs to be sent.

With reference to the third aspect, in a first possible implementation manner, specifically, the RLC protocol entity unit is further configured to send an RLC acknowledgment packet to the peer communications device after receiving the TCP acknowledgment packet that is sent by the TCP protocol entity unit and does not carry data information and discarding the received TCP acknowledgment packet.

With reference to the third aspect, in a second possible implementation manner, the RLC protocol entity unit is specifically configured to: if a current moment is a sending occasion of an RLC acknowledgment packet, determine not to send a TCP acknowledgment packet to the peer communications device, add TCP acknowledgment information in a currently received TCP acknowledgment packet to an RLC acknowledgment packet whose sending occasion is the current moment, and send, to the peer communications device, an RLC acknowledgment packet to which the TCP acknowledgment information is added; or if a current moment is not a sending occasion of an RLC acknowledgment packet, determine to send a TCP acknowledgment packet to the peer communications device, and send, to the peer communications device, a currently received TCP acknowledgment packet or a TCP acknowledgment packet that is obtained after information deletion is performed on the received TCP acknowledgment packet.

With reference to the second possible implementation manner of the third aspect, in a third possible implementation manner, the RLC protocol entity unit is specifically configured to: determine, after receiving an RLC acknowledgment packet that is sent by an RLC protocol entity unit of the peer communications device and carries TCP acknowledgment information, that a TCP acknowledgment packet needs to be sent, and send a TCP acknowledgment packet to the TCP protocol entity unit according to the TCP acknowledgment information carried in the received RLC acknowledgment packet.

With reference to the third aspect, in a fourth possible implementation manner, the RLC protocol entity unit is specifically configured to: discard a currently received TCP acknowledgment packet if it is acknowledged, according to the received TCP acknowledgment packet, that a corresponding RLC acknowledgment packet is sent; or send a currently received TCP acknowledgment packet to the peer communications device if it is acknowledged, according to the received TCP acknowledgment packet, that a corresponding RLC acknowledgment packet is not sent.

With reference to the fourth possible implementation manner of the third aspect, in a fifth possible implementation manner, the RLC protocol entity unit is further configured to: if it is acknowledged that an RLC acknowledgment packet that is not sent exists in acknowledgment packets of all RLC data packets corresponding to the received TCP acknowledgment packet, skip sending the RLC acknowledgment packet that is not sent.

With reference to the third aspect, in a sixth possible implementation manner, the RLC protocol entity unit is specifically configured to: when a sending occasion of an RLC acknowledgment packet arrives, if the TCP acknowledgment packet that is received from the TCP protocol entity unit and does not carry data information is currently buffered, determine not to send a TCP acknowledgment packet to the peer communications device, add TCP acknowledgment information in the buffered TCP acknowledgment packet to an RLC acknowledgment packet that needs to be sent at a current moment, and send, to the peer communications device, an RLC acknowledgment packet to which the TCP acknowledgment information is added.

According to a fourth aspect, a communications device is provided, including a transceiver and a processor, where: the transceiver is configured to: send a TCP acknowledgment packet to the processor, where the TCP acknowledgment packet is used to acknowledge that a TCP data packet sent by a peer communications device is received; and receive a TCP acknowledgment packet sent by the processor, where the TCP acknowledgment packet indicates that the peer communications device acknowledges that a corresponding TCP data packet is received; the processor is configured to: discard, after receiving a TCP acknowledgment packet that is sent by the transceiver and does not carry data information, the received TCP acknowledgment packet; or determine, according to a sending status of an RLC acknowledgment packet, whether to send a TCP acknowledgment packet to the peer communications device, and perform corresponding processing according to a result of the determining; and the processor is further configured to send, after receiving an RLC acknowledgment packet sent by the peer communications device, a TCP acknowledgment packet to the transceiver according to the received RLC acknowledgment packet if the processor determines, according to the received RLC acknowledgment packet, that a TCP acknowledgment packet needs to be sent.

With reference to the fourth aspect, in a first possible implementation manner, the processor is further configured to send an RLC acknowledgment packet to the peer communications device after receiving the TCP acknowledgment packet that is sent by the transceiver and does not carry data information and discarding the received TCP acknowledgment packet.

With reference to the fourth aspect, in a second possible implementation manner, the processor is specifically configured to: if a current moment is a sending occasion of an RLC acknowledgment packet, add TCP acknowledgment information in a currently received TCP acknowledgment packet to an RLC acknowledgment packet whose sending occasion is the current moment, and send, to the peer communications device, an RLC acknowledgment packet to which the TCP acknowledgment information is added; or if a current moment is not a sending occasion of an RLC acknowledgment packet, send, to the peer communications device, a currently received TCP acknowledgment packet or a TCP acknowledgment packet that is obtained after information deletion is performed on the received TCP acknowledgment packet.

With reference to the second possible implementation manner of the fourth aspect, in a third possible implementation manner, the processor is specifically configured to: determine, after receiving an RLC acknowledgment packet that is sent by the peer communications device and carries TCP acknowledgment information, that a TCP acknowledgment packet needs to be sent, and send a TCP acknowledgment packet to the transceiver according to the TCP acknowledgment information carried in the received RLC acknowledgment packet.

With reference to the fourth aspect, in a fourth possible implementation manner, the processor is specifically configured to: discard a currently received TCP acknowledgment packet if it is acknowledged, according to the received TCP acknowledgment packet, that a corresponding RLC acknowledgment packet is sent; or send a currently received TCP acknowledgment packet to the peer communications device if it is acknowledged, according to the received TCP acknowledgment packet, that a corresponding RLC acknowledgment packet is not sent.

With reference to the fourth possible implementation manner of the fourth aspect, in a fifth possible implementation manner, the processor is further configured to: if it is acknowledged that an RLC acknowledgment packet that is not sent exists in acknowledgment packets of all RLC data packets corresponding to the received TCP acknowledgment packet, skip sending the RLC acknowledgment packet that is not sent, send the received TCP acknowledgment packet to the peer communications device, and determine a next RLC acknowledgment packet according to a sequence number of an RLC data packet corresponding to the currently sent TCP acknowledgment packet.

With reference to the fourth aspect, in a sixth possible implementation manner, the processor is specifically configured to: when a sending occasion of an RLC acknowledgment packet arrives, if the TCP acknowledgment packet that is received from the transceiver and does not carry data information is currently buffered, add TCP acknowledgment information in the buffered TCP acknowledgment packet to an RLC acknowledgment packet that needs to be sent at a current moment, and send, to the peer communications device, an RLC acknowledgment packet to which the TCP acknowledgment information is added.

With reference to any possible implementation manner of the first to sixth possible implementation manner of the fourth aspect, in a seventh possible implementation manner, the processor is specifically configured to: if it is acknowledged, according to the received RLC acknowledgment packet, that a corresponding TCP data packet is correctly received, send a TCP acknowledgment packet responding to the correctly received TCP data packet to the transceiver of the communications device.

With reference to the seventh possible implementation manner of the fourth aspect, in an eighth possible implementation manner, the processor is specifically configured to determine, according to an RLC data packet corresponding to the received RLC acknowledgment packet, and a correspondence between a TCP data packet and an RLC data packet, whether the TCP data packet corresponding to the received RLC acknowledgment packet is correctly received.

With reference to any possible implementation manner of the first to the sixth possible implementation manners of the fourth aspect, in a ninth possible implementation manner, the processor is specifically configured to: generate a TCP acknowledgment packet according to the received RLC acknowledgment packet, and send the generated TCP acknowledgment packet to the communications device.

With reference to the ninth possible implementation manner of the fourth aspect, in a tenth possible implementation manner, the TCP acknowledgment packet generated by the processor carries indication information, which is used to indicate that the TCP acknowledgment packet is generated by the processor.

In the foregoing embodiments of the present invention, after receiving a TCP acknowledgment packet that is sent by a TCP protocol entity unit of a communications device and does not carry data information, an RLC protocol entity unit of the communications device discards the received TCP acknowledgment packet; or determines, according to a sending status of an RLC acknowledgment packet, whether to send a TCP acknowledgment packet to a peer communications device, and performs corresponding processing according to a result of the determining. This reduces a sending quantity of acknowledgment packets, compared with the prior art. In addition, after receiving an RLC acknowledgment packet sent by the peer communications device, the RLC protocol entity unit of the communications device sends a TCP acknowledgment packet to the TCP protocol entity unit of the communications device according to the received RLC acknowledgment packet if it is determined, according to the received RLC acknowledgment packet, that a TCP acknowledgment packet needs to be sent. Therefore, a packet acknowledgment mechanism is implemented in addition to reducing a sending quantity of acknowledgment packets.

DETAILED DESCRIPTION

For disadvantages existing in the prior art, embodiments of the present invention propose technical solutions in which sending of data acknowledgment information is reduced in a data transmission process. Specifically, transmission of TCP acknowledgment packets and/or RLC acknowledgment packets at a TCP layer and an RLC layer is mainly reduced in a packet transmission process. The embodiments of the present invention may be applied to a process of transmitting air interface data between a wireless terminal and a network device, so as to reduce sending of acknowledgment packets on an air interface, and further improve data transmission efficiency and resource utilization.

The embodiments of the present invention mainly focus on processing operations at the TCP layer and the RLC layer in a packet transmission process, and omit descriptions of processing processes at other protocol layers, such as an IP layer between the TCP layer and the RLC layer, and a PDCP (Packet Data Convergence Protocol, Packet Data Convergence Protocol) layer. For ease of understanding, descriptions of the embodiments of the present invention are based on the following agreements.

(1) A TCP protocol entity (may also be referred to as a TCP protocol entity unit in the embodiments) belongs to the TCP layer and is corresponding to the TCP layer, that is, the TCP protocol entity is an entity (or referred to as a functional module) that executes a TCP layer protocol; an RLC protocol entity (may also be referred to as an RLC protocol entity unit in the embodiments) belongs to the RLC layer and is corresponding to the RLC layer, that is, the RLC protocol entity is an entity (or referred to as a functional module) that executes an RLC layer protocol.

(2) In the embodiments, a "transmit end device" refers to a device that sends a data packet, and a "receive end device" refers to a device that receives the data packet.

(3) It is only a brief description that a TCP protocol entity at a transmit end device sends a TCP data packet to an RLC protocol entity of the transmit end device; in an actual operation, the TCP data packet may further need to pass through an IP layer, a PDCP layer, and the like, and vice versa. It is a brief description that an RLC protocol entity processes the TCP data packet to obtain an RLC layer data packet, and in this case, the RLC protocol entity may receive a PDCP data packet that includes the TCP data packet.

The following describes the embodiments of the present invention in detail with reference to accompanying drawings.

Embodiment 1

Figure 1:
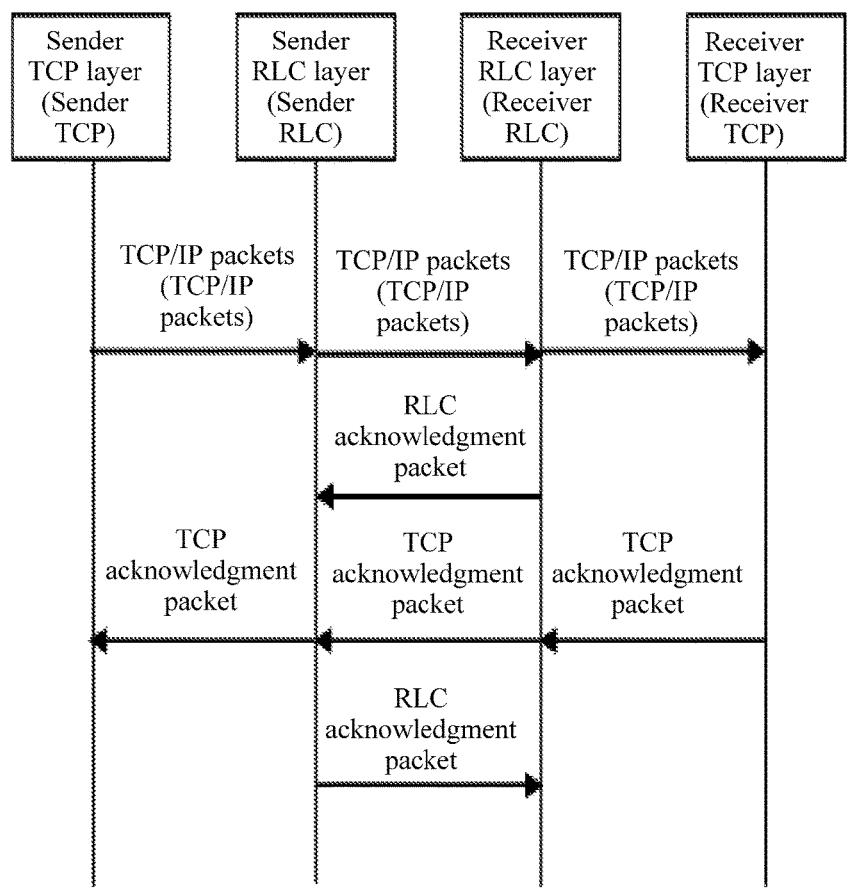
FIG. 1 is a schematic flowchart of data packet transmission in the prior art.
Figure 2:
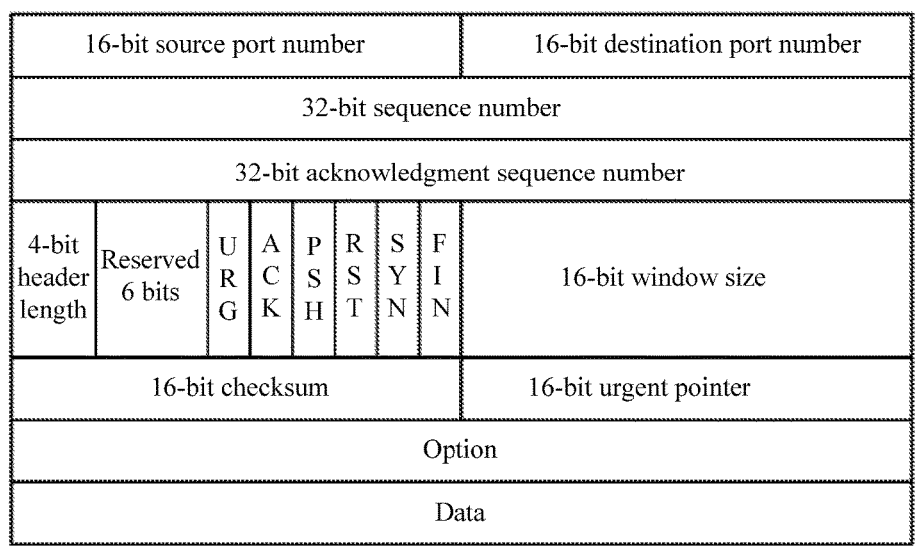
FIG. 2 is a schematic diagram of a format of a TCP data packet header in the prior art.
Figure 3:
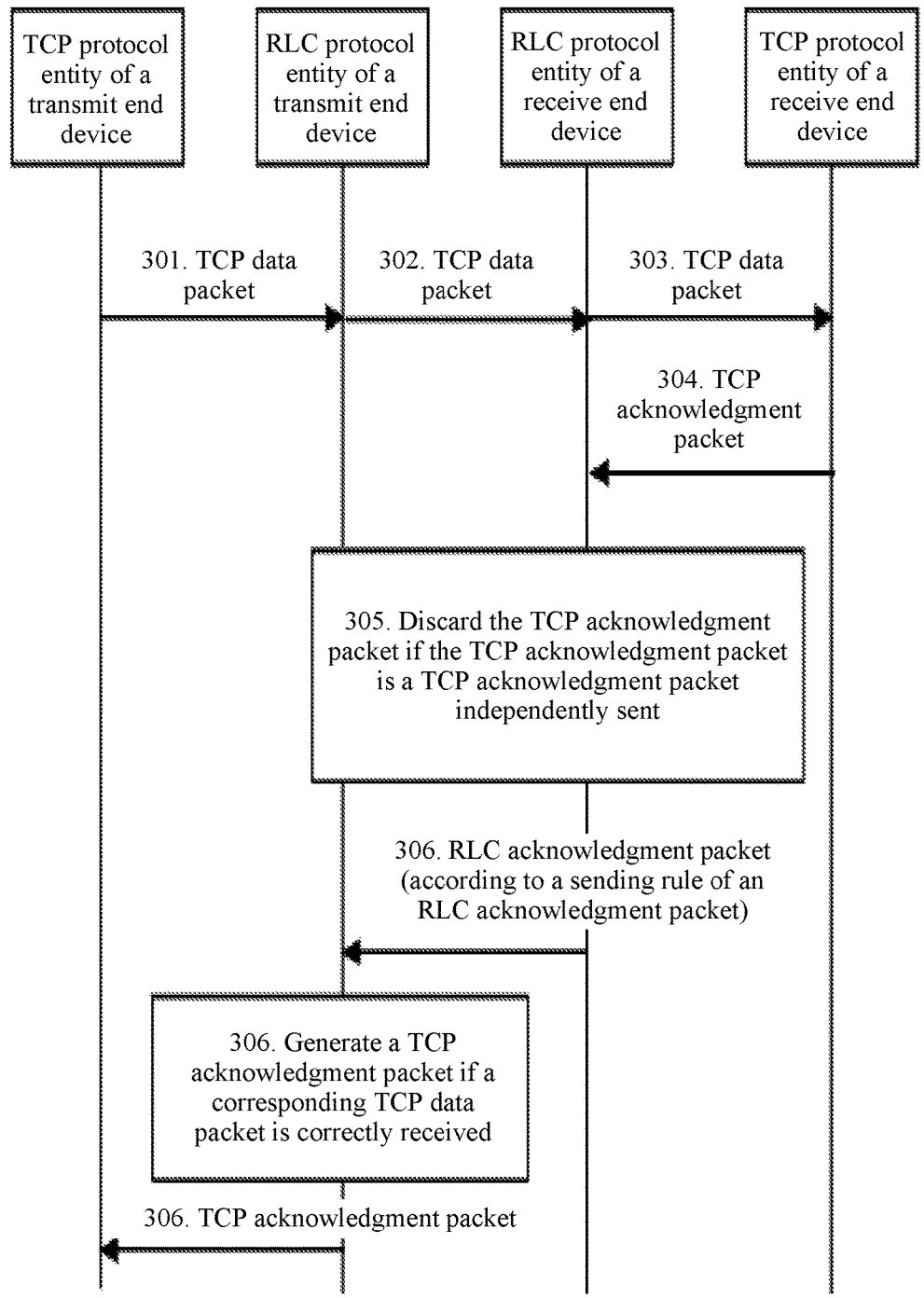
FIG. 3 is a schematic flowchart of a method for sending an acknowledgment packet according to Embodiment 1 of the present invention.

Referring to FIG. 3, FIG. 3 is a schematic diagram of a packet acknowledgment procedure according to Embodiment 1 of the present invention. In a process in which a transmit end device sends a packet to a receive end device, the procedure is executed by the following steps.

Step 301 to step 303: A TCP protocol entity of the transmit end device sends a TCP data packet to a TCP protocol entity of the receive end device.

In the steps, the TCP protocol entity of the transmit end device sends a TCP layer data packet (TCP data packet for short) to an RLC protocol entity of the transmit end device, and the RLC protocol entity processes the TCP data packet to obtain an RLC layer data packet (RLC data packet for short) and sends the RLC data packet. After receiving the RLC data packet sent by the RLC protocol entity of the transmit end device, an RLC protocol entity of the receive end device sends the RLC data packet to the TCP protocol entity of the receive end device. In the process, after receiving the RLC data packet sent by the RLC protocol entity of the transmit end device, the RLC protocol entity of the receive end device sends an RLC acknowledgment packet according to an existing rule of sending an RLC acknowledgement packet, that is, if a current moment is a sending occasion of an RLC acknowledgment packet, sends an RLC acknowledgment packet, or if a current moment is not a sending occasion of an RLC acknowledgment packet, does not send an RLC acknowledgment packet, and sends an RLC acknowledgment packet when a sending occasion of an RLC acknowledgment packet arrives.

The sending occasion of an RLC acknowledgment packet herein refers to a time when an RLC acknowledgment packet needs to be sent, and the sending occasion may be acknowledged according to a timer for prohibiting RLC sending or may be acknowledged according to a state variable of a receive end device. Both the foregoing acknowledgment manners are defined according to the existing sending rule of an RLC acknowledgment packet, and there is a detailed definition of the sending rule in the TS25.322 protocol.

Step 304: After receiving the TCP data packet, the TCP protocol entity of the receive end device sends a TCP acknowledgment packet according to an existing sending rule of a TCP acknowledgment packet. In the procedure, when a sending occasion of a TCP acknowledgment packet arrives, and there is no data packet that needs to be sent currently, the TCP protocol entity of the receive end device generates a TCP acknowledgment packet to be independently sent and sends the TCP acknowledgment packet to the RLC protocol entity of the receive end device. The TCP acknowledgment packet independently sent is a TCP acknowledgment packet that includes a transmission sequence number of a next data packet and has only header information but has no data information, and the acknowledgment packet is to acknowledge correct receiving of a previous TCP data packet.

Step 305: An RLC protocol entity of the receive end device discards the received TCP acknowledgment packet independently sent.

Optionally, if other information, in addition to information used to acknowledge correct receiving of a previous TCP data packet, is included in the TCP acknowledgment packet independently sent, the RLC protocol entity does not discard the TCP acknowledgment packet.

Step 306: After receiving an RLC acknowledgment packet sent by the RLC protocol entity of the receive end device, if it is acknowledged that a TCP data packet corresponding to the RLC acknowledgment packet is correctly received, an RLC protocol entity of the transmit end device generates a TCP acknowledgment packet responding to the TCP data packet and sends the generated TCP acknowledgment packet to the TCP protocol entity of the transmit end device.

Further, in step 306, when the RLC protocol entity of the transmit end device generates the TCP acknowledgment packet, in order to avoid a processing error of the TCP protocol entity of the transmit end device, it may be indicated in the generated TCP acknowledgement packet to the TCP protocol entity of the transmit end device that the TCP acknowledgment packet is generated by the RLC protocol entity. For example, that the acknowledgment packet is generated by the RLC protocol entity may be indicated by using a reserved bit in the TCP acknowledgment packet; or it may be considered that all acknowledgment packets received by the TCP protocol entity of the transmit end device are constructed by the RLC protocol entity provided that both the receive end device and the transmit end device agree to use an acknowledgment packet reducing manner in this embodiment.

Further, during application of the foregoing solution, the RLC protocol entity of the transmit end device needs to record information, such as a port number corresponding to the TCP data packet, which is used to pad a data packet header when the TCP acknowledgment packet is being generated.

Further, a function of generating (constructing) a TCP acknowledgment packet and/or recording information, such as a port number corresponding to a TCP data packet, by the foregoing transmit end device may be implemented in the RLC protocol entity of the transmit end device, or may be implemented by another functional entity, where the functional entity may be at the RLC layer, a PDCP layer, an IP layer, or the like, which is not limited herein. When the functional entity is a protocol entity at a layer except the RLC layer, optionally, the RLC layer needs to notify the functional entity of information about correctly receiving a TCP data packet.

In the foregoing procedure, optionally, in step 302, after processing the TCP data packet to obtain the RLC data packet, the RLC protocol entity of the transmit end device further records a correspondence between the TCP data packet and the RLC data packet (for example, records a sequence number of the TCP data packet, a sequence number of the RLC data packet, and a correspondence between the two); in step 306, after receiving the RLC acknowledgment packet sent by the RLC protocol entity of the receive end device, the RLC protocol entity of the transmit end device determines, according to the recorded correspondence between the TCP data packet and the RLC data packet, whether the TCP data packet corresponding to the received RLC acknowledgment packet is correctly received.

The foregoing TCP acknowledgment packet refers to feedback information that is of receiving a data packet and that is sent at a TCP layer, for example, a TCP ACK; the foregoing RLC acknowledgment packet refers to feedback information that is of receiving a data packet and that is sent at an RLC layer, which may be an RLC acknowledgment (RLC ACK), or may be an RLC negative acknowledgment (RLC NACK), or may be other acknowledgment information, and RLC ACK information is usually used herein in determining whether a data packet is correctly received.

A process in which device A sends a data packet to device B is used as an example in the following to illustrate a specific implementation process of Embodiment 1.

Figure 4:
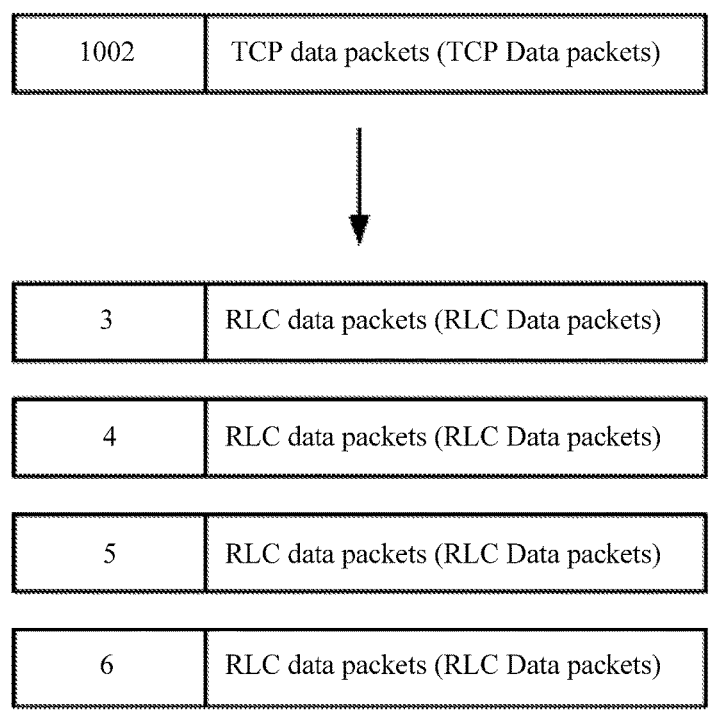
FIG. 4 is a schematic diagram of a correspondence between a TCP data packet and an RLC data packet according to an embodiment of the present invention.

A TCP protocol entity of device A sends a data packet whose TCP layer sequence number is 1002; after the data packet arrives at an RLC protocol entity of device A, as shown in FIG. 4, the RLC protocol entity segments the data packet into four data packets whose RLC layer sequence numbers are respectively 3, 4, 5, and 6, successively sends the four data packets, and records the TCP layer sequence number (1002) and the corresponding RLC layer sequence numbers (3, 4, 5, 6).

An RLC protocol entity of device B receives the data packets sent by the RLC protocol entity of device A, and sends a corresponding RLC ACK when a sending occasion of an RLC ACK arrives. After a TCP protocol entity of device B receives the data packet whose TCP layer sequence number is 1002, if the TCP protocol entity needs to send a TCP ACK for the data packet, the TCP protocol entity of device B sends the TCP ACK to the RLC protocol entity of device B; if the TCP ACK is a TCP ACK that does not include data information, the RLC protocol entity discards the received TCP ACK independently sent.

After receiving RLC layer acknowledgment information of the data packet whose RLC layer sequence number is 3, the RLC protocol entity of device A queries a recorded correspondence between the TCP layer sequence number (1002) of the data packet and the RLC layer sequence numbers (3, 4, 5, 6) of the data packets, acknowledges that not all the RLC layer data packets corresponding to the data packet whose TCP layer sequence number is 1002 are received, and therefore, continues to wait for acknowledgment information of other RLC data packets. Similarly, after receiving RLC layer acknowledgment information of the data packets whose RLC layer sequence numbers are 4 and 5, the RLC protocol entity of device A continues to wait for RLC layer acknowledgment information of a subsequent data packet; after receiving RLC layer acknowledgment information of the data packet whose RLC layer sequence number is 6, acknowledges that all segment blocks corresponding to the data packet whose TCP layer sequence number is 1002 are received, that is, acknowledges that the data packet whose TCP layer sequence number is 1002 is correctly received, generates a TCP ACK of the data packet, and sends the generated TCP ACK to the TCP protocol entity of device A.

Further, after receiving the data packet whose TCP layer sequence number is 1002, the TCP protocol entity of the device B sends a TCP acknowledgment packet according to a sending rule of a TCP acknowledgment packet; for example, a current moment may not be an occasion of feeding back a TCP acknowledgment packet, and therefore, a TCP acknowledgment packet is not sent. After acknowledging that the data packet whose TCP layer sequence number is 1002 is received, the RLC protocol entity of the device A may also generate (construct) and send, according to the sending rule of a TCP acknowledgment packet when a sending occasion of a TCP acknowledgment packet arrives, a TCP acknowledgment packet responding to the data packet whose TCP layer sequence number is 1002; if a current moment is not a sending occasion of a TCP acknowledgment packet, no TCP acknowledgment packet is generated (constructed).

It can be learned from the foregoing descriptions of Embodiment 1 that, an RLC protocol entity of a receive end device discards a TCP acknowledgment packet after receiving the TCP acknowledgment packet that is sent by a TCP protocol entity of the receive end device and does not carry data information; therefore, a process in which the receive end device transmits the TCP acknowledgment packet to a transmit end device is omitted, thereby reducing sending of acknowledgment packets on an air interface between the receive end device and the transmit end device, and further improving data transmission efficiency and resource utilization.

Embodiment 2

Figure 5:
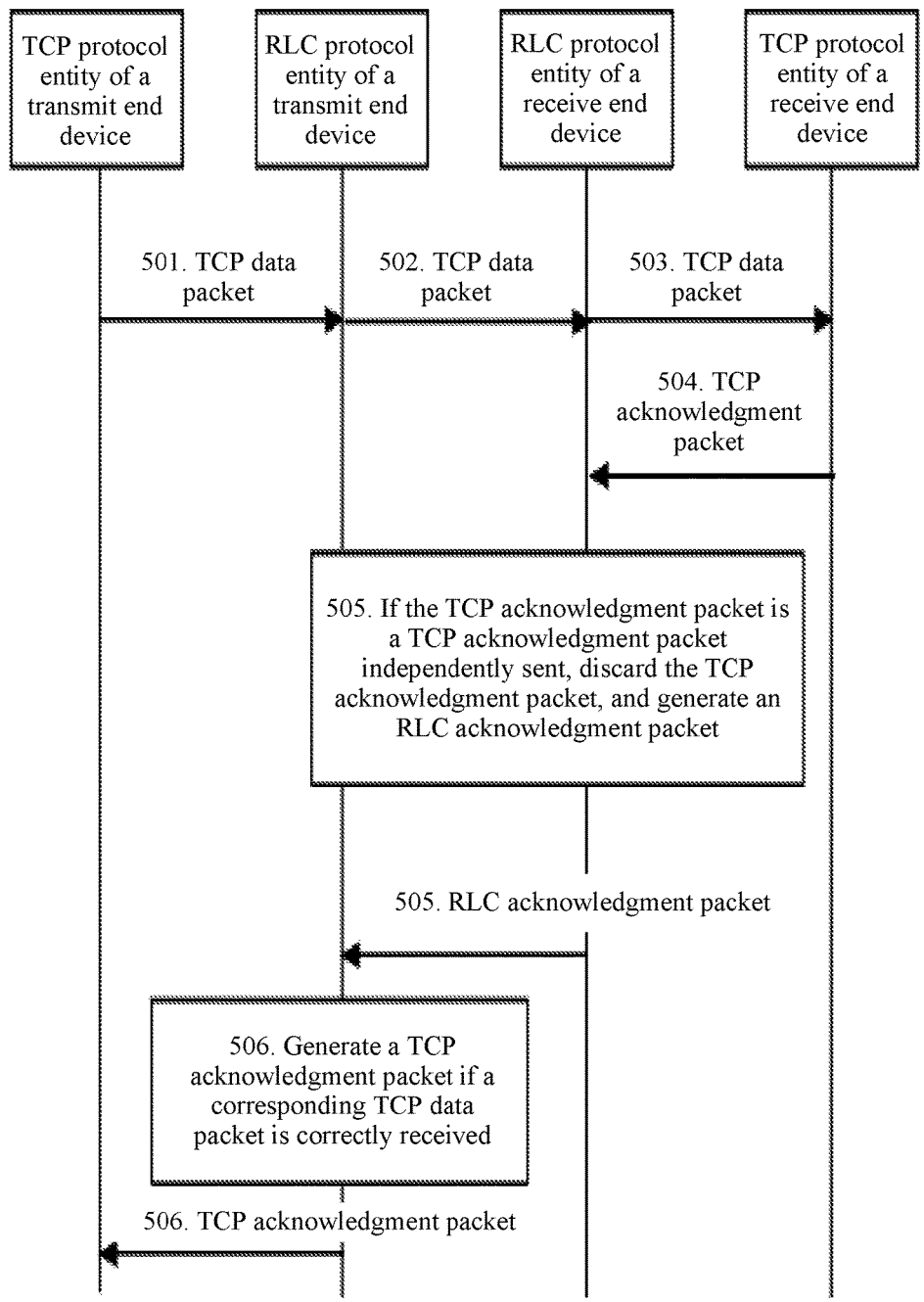
FIG. 5 is a schematic flowchart of a method for sending an acknowledgment packet according to Embodiment 2 of the present invention.

Referring to FIG. 5, FIG. 5 is a schematic diagram of a packet acknowledgment procedure according to Embodiment 2 of the present invention. In a process in which a transmit end device sends a packet to a receive end device, the procedure is executed by the following steps.

Step 501 to step 503: A TCP protocol entity of the transmit end device sends a TCP data packet to a TCP protocol entity of the receive end device.

In the steps, the TCP protocol entity of the transmit end device sends a TCP layer data packet (TCP data packet for short) to an RLC protocol entity of the transmit end device, and the RLC protocol entity processes the TCP data packet to obtain an RLC layer data packet (RLC data packet for short) and sends the RLC data packet. After receiving the RLC data packet sent by the RLC protocol entity of the transmit end device, an RLC protocol entity of the receive end device sends the RLC data packet to the TCP protocol entity of the receive end device. In the process, after receiving the RLC data packet sent by the RLC protocol entity of the transmit end device, the RLC protocol entity of the receive end device sends an RLC acknowledgment packet according to an existing sending rule of an RLC acknowledgment packet.

Step 504: After receiving the TCP data packet, the TCP protocol entity of the receive end device sends a TCP acknowledgment packet according to an existing sending rule of a TCP acknowledgment packet. In the procedure, when a sending occasion of a TCP acknowledgment packet arrives, and there is no data packet that needs to be sent currently, the TCP protocol entity of the receive end device generates a TCP acknowledgment packet to be independently sent and sends the TCP acknowledgment packet to the RLC protocol entity of the receive end device. The TCP acknowledgment packet independently sent is a TCP acknowledgment packet that includes a transmission sequence number of a next data packet and has only header information but has no data information, and the acknowledgment packet is to acknowledge correct receiving of a previous TCP data packet.

Step 505: An RLC protocol entity of the receive end device discards the received TCP acknowledgment packet independently sent, generates acknowledgment information of an RLC data packet, that is, an RLC acknowledgment packet, and sends the generated RLC acknowledgment information to an RLC protocol entity of the transmit end device. That is, the TCP acknowledgment packet sent by the TCP protocol entity of the receive end device triggers a process of sending the RLC acknowledgment information corresponding to the RLC data packet.

For example, after receiving four data packets whose RLC layer sequence numbers are 3, 4, 5, and 6 from the RLC protocol entity of the transmit end device, the RLC protocol entity of the receive end device performs decapsulation and assembly to obtain one data packet whose TCP layer sequence number is 1002, and sends the data packet to the TCP protocol entity of the receive end device. If the TCP protocol entity generates, for the data packet whose TCP layer sequence number is 1002, a TCP acknowledgment packet (TCP ACK) to be independently sent, and sends, to the RLC protocol entity of the receive end device, the TCP acknowledgment packet independently sent, the RLC protocol entity discards the received TCP ACK independently sent, generates an RLC acknowledgment packet responding to an RLC data packet, and sends the RLC acknowledgment packet to the RLC protocol entity of the transmit end device. When the RLC protocol entity of the receive end device receives the TCP acknowledgment packet independently sent by the TCP protocol entity of the receive end device, and a current moment may not be a sending occasion of an RLC acknowledgment packet, an RLC acknowledgment packet is generated and sent at this moment according to the foregoing procedure provided in this embodiment.

Further, after the RLC protocol entity of the receive end device sends the RLC acknowledgment packet, the RLC protocol entity of the receive end device counts again starting from one data packet following the acknowledgment packet, to determine a sending occasion of a next RLC acknowledgment packet. For example, if an RLC acknowledgment packet is sent every 40 ms, timing needs to start again after the RLC acknowledgment packet (that is, an RLC acknowledgment packet sent because of triggering by receiving a TCP acknowledgment packet) is sent, and the sending occasion of the next RLC acknowledgment packet arrives after 40 ms.

Optionally, if other information, in addition to information used to acknowledge correct receiving of another TCP data packet previous to the TCP data packet, is included in the TCP acknowledgment packet independently sent, the RLC protocol entity does not discard the TCP acknowledgment packet.

Step 506: After receiving the RLC acknowledgment packet sent by the RLC protocol entity of the receive end device, if it is acknowledged that a TCP data packet corresponding to the RLC acknowledgment packet is correctly received, the RLC protocol entity of the transmit end device generates a TCP acknowledgment packet responding to the TCP data packet and sends the generated TCP acknowledgment packet to the TCP protocol entity of the transmit end device.

Further, in step 506, when an acknowledgment packet generation entity (the RLC protocol entity is used as an example herein) of the transmit end device generates the TCP acknowledgment packet, in order to avoid a processing error of the TCP protocol entity of the transmit end device, further, that the TCP acknowledgment packet is generated by the RLC protocol entity may be indicated in the generated TCP acknowledgment packet to the TCP protocol entity of the transmit end device. For example, that the acknowledgment packet is generated by the RLC protocol entity may be indicated by using a reserved bit in the TCP acknowledgment packet; or it may be considered that all acknowledgment packets received by the TCP protocol entity of the transmit end device are constructed by the RLC protocol entity provided that both the receive end device and the transmit end device agree to use an acknowledgment packet reducing manner in this embodiment.

Further, during application of the foregoing solution, the RLC protocol entity of the transmit end device needs to record information, such as a port number corresponding to the TCP data packet, which is used to pad a data packet header when the TCP acknowledgment packet is being generated.

Further, a function of generating (constructing) a TCP acknowledgment packet and/or recording information, such as a port number corresponding to a TCP data packet, by the foregoing transmit end device may be implemented in the RLC protocol entity of the transmit end device, or may be implemented by another functional entity, where the functional entity may be at an RLC layer, a PDCP layer, an IP layer, or the like, which is not limited herein. When the functional entity is a protocol entity at a layer except the RLC layer, optionally, the RLC layer needs to notify the functional entity of information about correctly receiving a TCP data packet.

In the foregoing procedure, optionally, in step 502, the RLC protocol entity of the transmit end device records a correspondence between the TCP data packet and the RLC data packet (for example, records a sequence number of the TCP data packet, a sequence number of the RLC data packet, and a correspondence between the two); in step 506, after receiving the RLC acknowledgment packet sent by the RLC protocol entity of the receive end device, the RLC protocol entity of the transmit end device determines, according to the recorded correspondence between the TCP data packet and the RLC data packet, whether the TCP data packet corresponding to the received RLC acknowledgment packet is correctly received.

It can be learned from the foregoing descriptions of Embodiment 2 that, an RLC protocol entity of a receive end device discards a TCP acknowledgment packet after receiving the TCP acknowledgment packet that is sent by a TCP protocol entity of the receive end device and does not carry data information, and sending of an RLC acknowledgment packet is triggered; therefore, a process in which the receive end device transmits the TCP acknowledgment packet to a transmit end device is omitted, thereby reducing sending of acknowledgment packets on an air interface between the receive end device and the transmit end device, and further improving data transmission efficiency and resource utilization.

Embodiment 3

Figure 6:
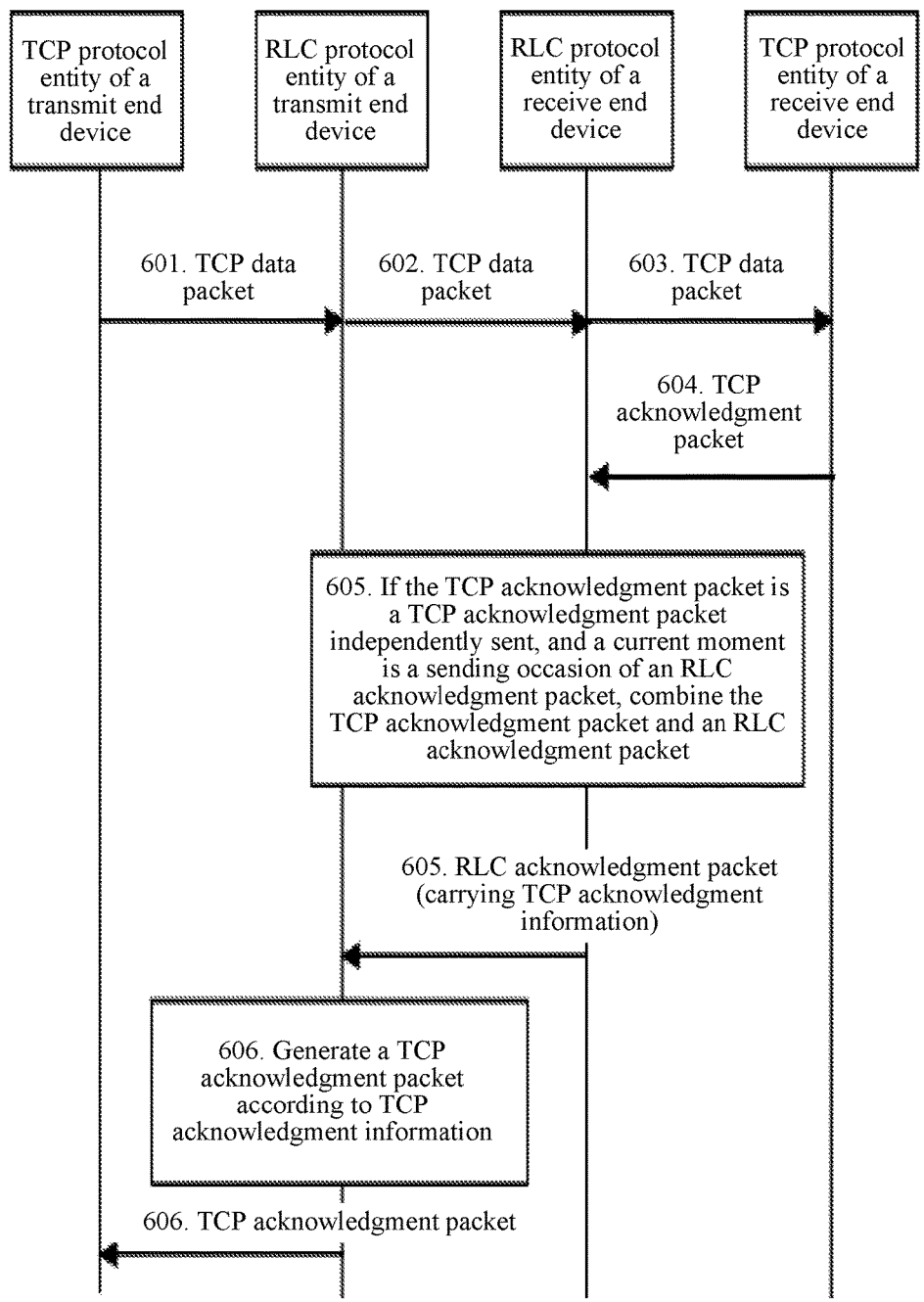
FIG. 6 is a schematic flowchart of a method for sending an acknowledgment packet according to Embodiment 3 of the present invention.

Referring to FIG. 6, FIG. 6 is a schematic diagram of a packet acknowledgment procedure according to Embodiment 3 of the present invention. In a process in which a transmit end device sends a packet to a receive end device, the procedure is executed by the following steps.

Step 601 to step 603: A TCP protocol entity of the transmit end device sends a TCP data packet to a TCP protocol entity of the receive end device.

In the steps, the TCP protocol entity of the transmit end device sends a TCP data packet to an RLC protocol entity of the transmit end device, and the RLC protocol entity processes the TCP data packet to obtain an RLC layer data packet (RLC data packet for short) and sends the RLC data packet. After receiving the RLC data packet sent by the RLC protocol entity of the transmit end device, an RLC protocol entity of the receive end device sends the RLC data packet to the TCP protocol entity of the receive end device. In the process, after receiving the RLC data packet sent by the RLC protocol entity of the transmit end device, the RLC protocol entity of the receive end device determines, according to an existing sending rule of an RLC acknowledgment packet, whether a current moment is a sending occasion of an RLC acknowledgment packet; if the current moment is not a sending occasion of an RLC acknowledgment packet, does not send an RLC acknowledgment packet; if the current moment is a sending occasion of an RLC acknowledgment packet, and further, a TCP acknowledgment packet independently sent by the TCP protocol entity of the receive end device is currently received, sends, to the transmit end device according to the following description of step 605, an acknowledgment packet obtained after combining an RLC acknowledgment packet and the TCP acknowledgment packet.

Step 604: After receiving the TCP data packet, the TCP protocol entity of the receive end device sends a TCP acknowledgment packet according to an existing sending rule of a TCP acknowledgment packet. In the procedure, when a sending occasion of a TCP acknowledgment packet arrives, and there is no data packet that needs to be sent currently, the TCP protocol entity of the receive end device generates a TCP acknowledgment packet to be independently sent and sends the TCP acknowledgment packet to the RLC protocol entity of the receive end device. The TCP acknowledgment packet independently sent is a TCP acknowledgment packet that includes a transmission sequence number of a next data packet and has only header information but has no data information, and the acknowledgment packet is to acknowledge correct receiving of a previous TCP data packet.

Step 605: An RLC protocol entity of the receive end device receives the TCP acknowledgment packet independently sent, and if a current moment is a sending occasion of an RLC acknowledgment packet, sends, to an RLC protocol entity of the transmit end device, an acknowledgment packet obtained after combining an RLC acknowledgment packet and the TCP acknowledgment packet.

Figure 8:
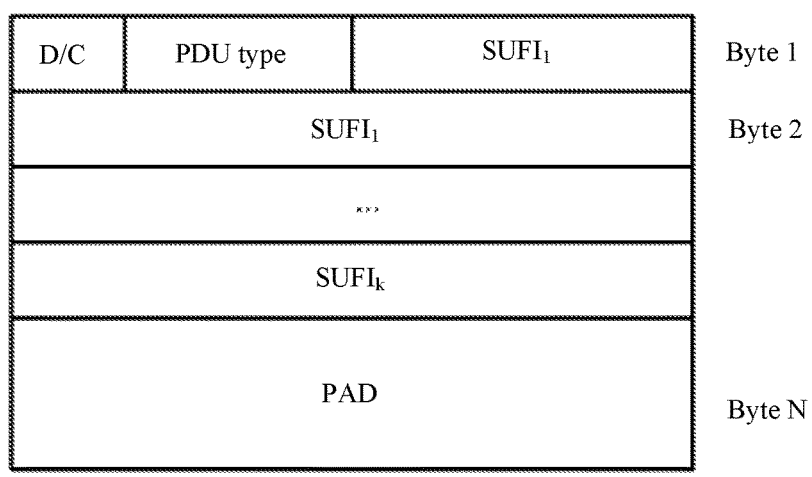
FIG. 8 is a schematic diagram of a format of a data packet responding to an RLC acknowledgment packet according to an embodiment of the present invention.

Optionally, in the step, if the RLC protocol entity of the receive end device receives the TCP acknowledgment packet independently sent by the TCP protocol entity of the receive end device, and the current moment is a sending occasion of an RLC acknowledgment packet, when sending the acknowledgment packet obtained after combining the received TCP acknowledgment packet and the RLC acknowledgment packet that currently needs to be sent, the RLC protocol entity may add, by means of modifying a format of a data packet of the RLC acknowledgment packet, information about a sequence number of a next to-be-received TCP acknowledgment packet to the data packet of the RLC acknowledgment packet. FIG. 8 shows a modified format of a data packet of an RLC acknowledgment packet.

D/C indicates whether the data packet is control information or a service data packet.

The field PDU Type indicates that the RLC acknowledgment packet includes TCP acknowledgment information.

The field SUFI is used to carry RLC layer acknowledgment information.

PAD (padding) represents padding information, which is to ensure that the data packet meets a pre-defined size.

Optionally, in the step, a specific implementation manner of sending an acknowledgment packet obtained after combining an RLC acknowledgment packet and the TCP acknowledgment packet includes that: the RLC protocol entity of the receive end device sends only an RLC acknowledgment packet (including TCP acknowledgment information) and discards the TCP acknowledgment packet, or the RLC protocol entity of the receive end device sends only a TCP acknowledgment packet (including RLC acknowledgment information) and discards the RLC acknowledgment packet. Further, to identify that the RLC acknowledgment packet or the TCP acknowledgment packet is discarded, indication information of the discarded acknowledgment packet is added to the sent acknowledgment packet.

Step 606: After receiving the combined acknowledgment packet sent by the RLC protocol entity of the receive end device, if it is determined that a corresponding TCP data packet is correctly received, the RLC protocol entity of the transmit end device generates a TCP acknowledgment packet, and sends the generated TCP acknowledgment packet to the TCP protocol entity of the transmit end device.

Further, in step 606, when the RLC protocol entity of the transmit end device generates the TCP acknowledgment packet, in order to avoid a processing error of the TCP protocol entity of the transmit end device, that the TCP acknowledgment packet is generated by the RLC protocol entity may be indicated in the generated TCP acknowledgment packet to the TCP protocol entity of the transmit end device. For example, that a data packet is generated by the RLC protocol entity may be indicated by using a reserved bit in the data packet of the TCP acknowledgment packet; or it may be considered that all acknowledgment packets received by the TCP protocol entity of the transmit end device are constructed by the RLC protocol entity provided that both the receive end device and the transmit end device agree to use an acknowledgment packet reducing manner in this embodiment.

Further, during application of the foregoing solution, the RLC protocol entity of the transmit end device needs to record information, such as a port number corresponding to the TCP data packet, which is used to pad a data packet header when the TCP acknowledgment packet is being generated.

Further, a function of generating (constructing) a TCP acknowledgment packet and/or recording information, such as a port number corresponding to a TCP data packet, by the foregoing transmit end device may be implemented in the RLC protocol entity of the transmit end device, or may be implemented by another functional module, where the functional entity may be at an RLC layer, a PDCP layer, an IP layer, or the like, which is not limited herein. When the functional entity is a protocol entity at a layer except the RLC layer, optionally, the RLC layer needs to notify the functional entity of information about correctly receiving a TCP data packet (that is, TCP acknowledgment information carried in the sent acknowledgment packet obtained after combination).

The foregoing procedure is described by using an example in which a current moment is a sending occasion of an RLC acknowledgment packet after the RLC protocol entity of the receive end device receives the TCP acknowledgment packet independently sent. If the current moment is not a sending time of an RLC acknowledgment packet, the RLC protocol entity sends the received TCP acknowledgment packet to the TCP protocol entity of the transmit end device. Further, when the RLC protocol entity sends the received TCP acknowledgment packet to the transmit end device, information such as a port number in the TCP acknowledgment packet may be removed, but a TCP acknowledgment sequence number needs to be reserved, and preferably, only the TCP acknowledgment sequence number may be reserved. The RLC protocol entity re-encapsulates the TCP acknowledgment packet again, and sends the re-encapsulated TCP acknowledgment packet obtained by means of encapsulation again, so as to reduce a data volume of TCP acknowledgment packets.

The foregoing TCP acknowledgment packet refers to feedback information that is of receiving a data packet and that is sent at a TCP layer, for example, a TCP ACK; the foregoing RLC acknowledgment packet refers to feedback information that is of receiving a data packet and that is sent at an RLC layer, which may be an RLC acknowledgment (RLC ACK), or may be an RLC negative acknowledgment (RLC NACK), or may be other acknowledgment information, and RLC ACK information is usually used herein in determining whether a data packet is correctly received.

A process in which device A sends a data packet to device B is used as an example in the following to illustrate a specific implementation process of Embodiment 3.

A TCP protocol entity of device A sends a data packet whose TCP layer sequence number is 1002; after the data packet arrives at an RLC protocol entity of device A, as shown in FIG. 4, the RLC protocol entity segments the data packet into four data packets whose RLC layer sequence numbers are respectively 3, 4, 5, and 6, and successively sends the four data packets.

After receiving the data packets sent by the RLC protocol entity of device A, an RLC protocol entity of device B sends RLC ACKs for the received RLC layer data packets to device A in a case in which a sending occasion of an RLC ACK arrives and a TCP ACK sent by a TCP protocol entity of device B is not received at a current moment. After receiving the data packets whose TCP layer sequence numbers are 3, 4, 5, and 6, the RLC protocol entity of device B performs decapsulation to obtain one data packet, and sends the data packet to the TCP protocol entity of device B; the TCP protocol entity generates, for the data packet, a TCP ACK to be independently sent, and sends the TCP ACK to the RLC protocol entity of device B; the RLC protocol entity receives the TCP ACK, determines that a current moment is a sending occasion of an RLC ACK of the data packet whose RLC layer sequence number is 6, and generates the RLC ACK of the data packet whose RLC layer sequence number is 6, where the generated RLC ACK carries a sequence number 1003 of a next to-be-received TCP data packet in addition to RLC layer acknowledgment information.

After receiving the RLC ACK that carries the TCP ACK information, the RLC protocol entity of device A acknowledges, according to the carried TCP acknowledgment sequence number 1003, that the corresponding data packet is correctly received, generates a TCP ACK of the data packet, and sends the generated TCP ACK to the TCP protocol entity of device A.

It can be learned from the foregoing descriptions of Embodiment 3 that, an RLC protocol entity of a receive end device sends, after receiving a TCP acknowledgment packet sent by a TCP protocol entity of the receive end device, an acknowledgment packet obtained after combining the TCP acknowledgment packet and an RLC acknowledgment packet; therefore, a process in which the receive end device transmits an RLC acknowledgment packet and/or a TCP acknowledgment packet to a transmit end device is omitted, thereby reducing sending of acknowledgment packets on an air interface between the receive end device and the transmit end device, and further improving data transmission efficiency and resource utilization.

Embodiment 4

Figure 7:
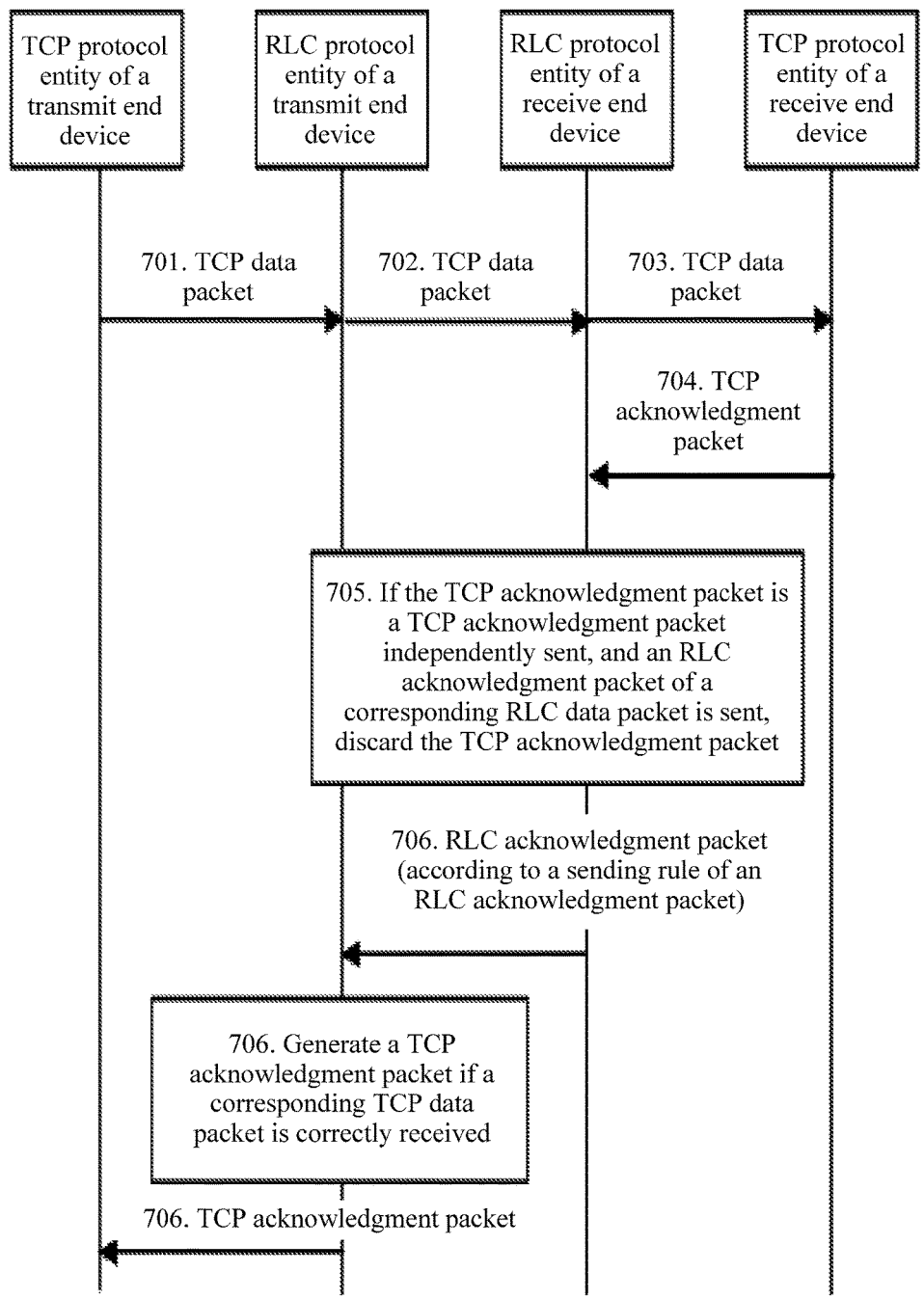
FIG. 7 is a schematic flowchart of a method for sending an acknowledgment packet according to Embodiment 4 of the present invention.

Referring to FIG. 7, FIG. 7 is a schematic diagram of a packet acknowledgment procedure according to Embodiment 4 of the present invention. In a process in which a transmit end device sends a packet to a receive end device, the procedure is executed by the following steps.

Step 701 to step 703: A TCP protocol entity of the transmit end device sends a TCP data packet to a TCP protocol entity of the receive end device.

In the steps, the TCP protocol entity of the transmit end device sends a TCP layer data packet (TCP data packet for short) to an RLC protocol entity of the transmit end device, and the RLC protocol entity processes the TCP data packet to obtain an RLC layer data packet (RLC data packet for short) and sends the RLC data packet. After receiving the RLC data packet sent by the RLC protocol entity of the transmit end device, an RLC protocol entity of the receive end device sends the RLC data packet to the TCP protocol entity of the receive end device. In the process, after receiving the RLC data packet sent by the RLC protocol entity of the transmit end device, the RLC protocol entity of the receive end device sends an RLC acknowledgment packet according to an existing sending rule of an RLC acknowledgment packet.

Step 704: After receiving the TCP data packet, the TCP protocol entity of the receive end device sends a TCP acknowledgment packet according to an existing sending rule of a TCP acknowledgment packet. In the procedure, when a sending occasion of a TCP acknowledgment packet arrives, and there is no TCP data packet that needs to be sent currently, the TCP protocol entity of the receive end device generates a TCP acknowledgment packet to be independently sent and sends the TCP acknowledgment packet to the RLC protocol entity of the receive end device. The TCP acknowledgment packet independently sent is a TCP acknowledgment packet that includes a transmission sequence number of a next data packet and has only header information but has no TCP data information, and the acknowledgment packet is to acknowledge correct receiving of a previous TCP data packet.

Step 705: After an RLC protocol entity of the receive end device receives the TCP acknowledgment packet independently sent, if it is determined that an RLC acknowledgment packet corresponding to the received TCP acknowledgment packet is sent, the RLC protocol entity discards the received TCP acknowledgment packet, where the RLC acknowledgment packet corresponding to the TCP acknowledgment packet refers to an RLC acknowledgment packet responding to an RLC data packet corresponding to a TCP data packet corresponding to the TCP acknowledgment packet.

Preferably, the RLC protocol entity of the receive end device may acknowledge the RLC acknowledgment packet corresponding to the received TCP acknowledgment packet in the following manner: determining, according to a TCP data packet acknowledged according to the received TCP acknowledgment packet, all RLC data packets corresponding to the TCP data packet, where RLC acknowledgment packets corresponding to the RLC data packets are the RLC acknowledgment packets corresponding to the TCP acknowledgment packet.

Optionally, if other information, in addition to information used to acknowledge correct receiving of a previous TCP data packet, is included in the TCP acknowledgment packet independently sent, the RLC protocol entity does not discard the TCP acknowledgment packet.

Step 706: If acknowledging that the RLC acknowledgment packet corresponding to the TCP data packet is received, an RLC protocol entity of the transmit end device generates a TCP acknowledgment packet responding to the TCP data packet, and sends the generated TCP acknowledgment packet to the TCP protocol entity of the transmit end device.

In the step, further, when the RLC protocol entity of the transmit end device generates the TCP acknowledgment packet, in order to avoid a processing error of the TCP protocol entity of the transmit end device, that the TCP acknowledgment packet is generated by the RLC protocol entity may be indicated in the generated TCP acknowledgment packet to the TCP protocol entity of the transmit end device. For example, that the acknowledgment packet is generated by the RLC protocol entity may be indicated by using a reserved bit in the TCP acknowledgment packet.

Further, during application of the foregoing solution, the RLC protocol entity of the transmit end device needs to record information, such as a port number corresponding to the TCP data packet, which is used to pad a data packet header when the TCP acknowledgment packet is being generated.

Further, a function of generating (constructing) a TCP acknowledgment packet and/or recording information, such as a port number corresponding to a TCP data packet, by the foregoing transmit end device may be implemented in the RLC protocol entity of the transmit end device, or may be implemented by another functional module, which is not limited herein.

Optionally, in the foregoing steps 701 to 703, the RLC protocol entity of the transmit end device and the RLC protocol entity of the receive end device may further record a correspondence between the TCP data packet and the RLC data packet (for example, record a sequence number of the TCP data packet, a sequence number of the RLC data packet, and a correspondence between the two); the RLC protocol entity of the receive end device further obtains the correspondence between the TCP data packet and the RLC data packet (for example, the sequence number of the TCP data packet, the sequence number of the RLC data packet, and the correspondence between the two) according to the received RLC data packet, and records information about the correspondence. In step 705, after receiving the TCP acknowledgment packet independently sent, the RLC protocol entity of the receive end device determines, according to the recorded correspondence between the TCP data packet and the RLC data packet, whether the RLC acknowledgment packet responding to the RLC data packet corresponding to the received TCP acknowledgment packet is sent. In step 706, the RLC protocol entity of the transmit end device acknowledges, according to the recorded information about the correspondence between the TCP data packet and the RLC data packet, whether the RLC data packet corresponding to the TCP data packet is received.

Step 705 in the foregoing procedure may be replaced with the following: After receiving the TCP acknowledgment packet independently sent, if it is determined that the RLC acknowledgment packet responding to the RLC data packet corresponding to the received TCP acknowledgment packet is not sent (for example, it may be determined according to the recorded correspondence between the TCP data packet and the RLC data packet), the RLC protocol entity of the receive end device sends the received TCP acknowledgment packet to the transmit end device; further, for an RLC data packet of an RLC acknowledgment packet that is not sent, the RLC protocol entity does not send any longer the RLC acknowledgment packet. Correspondingly, step 706 may be replaced with the following: After receiving the TCP acknowledgment packet sent by the receive end device, the RLC protocol entity of the transmit end device sends the TCP acknowledgment packet to the TCP protocol entity of the transmit end device.

The foregoing TCP acknowledgment packet refers to feedback information that is of receiving a data packet and that is sent at a TCP layer, for example, a TCP ACK; the foregoing RLC acknowledgment packet refers to feedback information that is of receiving a data packet and that is sent at an RLC layer, which may be an RLC acknowledgment (RLC ACK), or may be an RLC negative acknowledgment (RLC NACK), or may be other acknowledgment information, and RLC ACK information is usually used herein in determining whether a data packet is correctly received.

A process in which device A sends a data packet to device B is used as an example in the following to illustrate a specific implementation process of Embodiment 4.

A TCP protocol entity of device A sends a data packet whose TCP layer sequence number is 1002; after the data packet arrives at an RLC protocol entity of device A, as shown in FIG. 4, the RLC protocol entity segments the data packet into four data packets whose RLC layer sequence numbers are respectively 3, 4, 5, and 6, successively sends the four data packets, and records a correspondence between the TCP layer sequence number (1002) and the RLC layer sequence numbers (3, 4, 5, 6).

An RLC protocol entity of device B receives the data packets sent by the RLC protocol entity of device A; obtains the TCP layer sequence number (1002), the RLC layer sequence numbers (3, 4, 5, 6), and the correspondence between the two from the received data packets; and sends an RLC ACK to the RLC protocol entity of device A according to an existing sending rule of an RLC ACK. After receiving the data packet whose TCP layer sequence number is 1002, if a sending occasion of a TCP ACK is met and there is no TCP data packet that needs to be sent, a TCP protocol entity of device B generates, for the data packet, a TCP ACK to be independently sent, and sends the TCP ACK to the RLC protocol entity of a device B. The RLC protocol entity receives the TCP ACK, acknowledges that RLC ACKs of the data packets whose RLC layer sequence numbers are 3 and 4 are sent and RLC ACKs of the data packets whose RLC layer sequence numbers are 5 and 6 are not sent, sends the TCP ACK to device A, and does not send any longer the RLC ACKs of the data packets whose RLC layer sequence numbers are 5 and 6.

After receiving the RLC ACK corresponding to the data packet whose RLC layer sequence number is 3, the RLC protocol entity of device A queries the recorded correspondence between the TCP layer sequence number (1002) and the RLC layer sequence numbers (3, 4, 5, 6), acknowledges that not all the RLC data packets corresponding to the data packet whose TCP layer sequence number is 1002 are received, and therefore, continues to wait for other RLC ACKs. Similarly, after receiving the RLC ACKs corresponding to the data packets whose RLC layer sequence numbers are 4 and 5, the RLC protocol entity of device A continues to wait for another RLC ACK; after receiving the RLC ACK corresponding to the data packet whose RLC layer sequence number is 6, acknowledges that all segment blocks corresponding to the data packet whose TCP layer sequence number is 1002 are received, that is, acknowledges that all the RLC data packets corresponding to the data packet whose TCP layer sequence number is 1002 are correctly received, generates a TCP ACK for the data packet whose TCP layer sequence number is 1002, and sends the TCP ACK to the TCP protocol entity of device A.

In another instance, after receiving a TCP ACK corresponding to the data packet whose TCP layer sequence number is 1002, if it is determined that not all RLC ACKs of the data packets whose RLC layer sequence numbers are 3, 4, 5, and 6 are sent, the RLC protocol entity of device B sends the received TCP ACK, and considers at the same time that RLC acknowledgment packets of all the data packets previous to the data packet whose RLC layer sequence number is 6 are not sent any longer. After receiving the TCP ACK, the RLC protocol entity of device A acknowledges that the data packet whose TCP layer sequence number is 1002 is correctly received, therefore, sends the TCP ACK to the TCP protocol entity of device A, and considers at the same time that all the data packets previous to the data packet whose RLC layer sequence number is 6 are correctly received.

It can be learned from the foregoing descriptions of Embodiment 4 that, when a corresponding RLC acknowledgment packet is sent, an RLC protocol entity of a receive end device skips sending a TCP acknowledgment packet after receiving the TCP acknowledgment packet sent by a TCP protocol entity of the receive end device; therefore, a process in which the receive end device transmits the TCP acknowledgment packet to a transmit end device is omitted. In addition, after sending a TCP acknowledgment packet, the RLC protocol entity of the receive end device does not send any longer an RLC acknowledgment packet that is not sent, so that a process in which the receive end device transmits the RLC acknowledgment packet to the transmit end device is omitted, thereby reducing sending of acknowledgment packets on an air interface between the receive end device and the transmit end device, and further improving data transmission efficiency and resource utilization.

Embodiment 5

Figure 9:
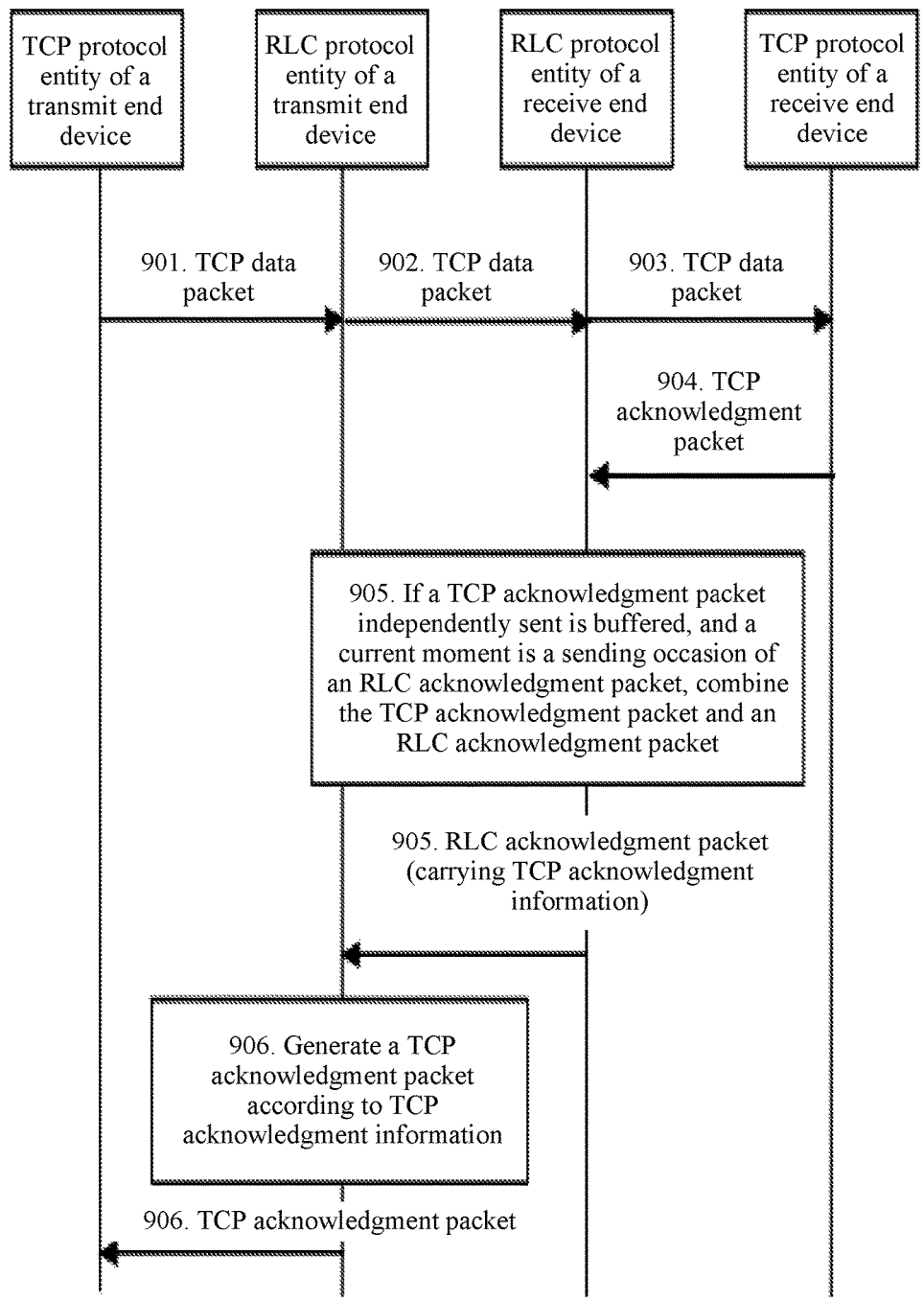
FIG. 9 is a schematic flowchart of a method for sending an acknowledgment packet according to Embodiment 5 of the present invention.

Referring to FIG. 9, FIG. 9 is a schematic diagram of a packet acknowledgment procedure according to Embodiment 5 of the present invention. In a process in which a transmit end device sends a packet to a receive end device, the procedure is executed by the following steps.

Step 901 to step 903: A TCP protocol entity of the transmit end device sends a TCP data packet to a TCP protocol entity of the receive end device.

In the steps, the TCP protocol entity of the transmit end device sends a TCP layer data packet (TCP data packet for short) to an RLC protocol entity of the transmit end device, and the RLC protocol entity processes the TCP data packet to obtain an RLC layer data packet (RLC data packet for short) and sends the RLC data packet. After receiving the RLC data packet sent by the RLC protocol entity of the transmit end device, an RLC protocol entity of the receive end device sends the RLC data packet to the TCP protocol entity of the receive end device. In the process, after receiving the RLC data packet sent by the RLC protocol entity of the transmit end device, and when a sending occasion of an RLC acknowledgment packet arrives, the RLC protocol entity of the receive end device sends an RLC acknowledgment packet to the transmit end device in a case in which currently there is no buffered TCP acknowledgment packet sent by the TCP protocol entity of the receive end device.

Step 904: After receiving the TCP data packet, the TCP protocol entity of the receive end device sends a TCP acknowledgment packet according to an existing sending rule of a TCP acknowledgment packet. In the procedure, when a sending occasion of a TCP acknowledgment packet arrives, and there is no data packet that needs to be sent currently, the TCP protocol entity of the receive end device generates a TCP acknowledgment packet to be independently sent and sends the TCP acknowledgment packet to the RLC protocol entity of the receive end device. The TCP acknowledgment packet independently sent is a TCP acknowledgment packet that includes a transmission sequence number of a next data packet and has only header information but has no data information, and the acknowledgment packet is to acknowledge correct receiving of a previous TCP data packet.

Step 905: When a sending occasion of an RLC acknowledgment packet arrives, if an RLC protocol entity of the receive end device detects that a TCP acknowledgment packet independently sent by the TCP protocol entity of the receive end device is currently buffered, the RLC protocol entity of the receive end device sends, to the transmit end device, an acknowledgment packet obtained after combining the buffered TCP acknowledgment packet and an RLC acknowledgment packet that needs to be sent currently.

Optionally, in the step, if the RLC protocol entity of the receive end device detects that the TCP acknowledgment packet independently sent by the TCP protocol entity of the receive end device is currently buffered, and a current moment is a sending occasion of an RLC acknowledgment packet, when sending the acknowledgment packet obtained after combining the currently buffered TCP acknowledgment packet and the RLC acknowledgment packet that currently needs to be sent, the RLC protocol entity may add, by means of modifying a format of a data packet of the RLC acknowledgment packet, information about a sequence number of a next to-be-received TCP acknowledgment packet to the data packet of the RLC acknowledgment packet.

Optionally, in the step, a specific implementation manner of sending an acknowledgment packet obtained after combining an RLC acknowledgment packet and the TCP acknowledgment packet includes that: the RLC protocol entity of the receive end device sends only an RLC acknowledgment packet (including TCP acknowledgment information) and discards the TCP acknowledgment packet, or the RLC protocol entity of the receive end device sends only a TCP acknowledgment packet (including RLC acknowledgment information) and discards the RLC acknowledgment packet. Further, to identify that the RLC acknowledgment packet or the TCP acknowledgment packet is discarded, indication information of the discarded acknowledgment packet is added to the sent acknowledgment packet.

Optionally, in the step, if the RLC protocol entity of the receive end device detects that a TCP acknowledgment packet is currently buffered, and a current moment is a sending occasion of an RLC acknowledgment packet, when sending the acknowledgment packet obtained after combining the currently buffered TCP acknowledgment packet and the RLC acknowledgment packet that currently needs to be sent, the RLC protocol entity may add, by means of modifying a format of a data packet of the RLC acknowledgment packet, information about a sequence number of a next to-be-received TCP acknowledgment packet to the data packet of the RLC acknowledgment packet.

Step 906: After receiving the combined acknowledgment packet sent by the RLC protocol entity of the receive end device, if it is determined that a corresponding TCP data packet is correctly received, an RLC protocol entity of the transmit end device generates a TCP acknowledgment packet, and sends the generated TCP acknowledgment packet to the TCP protocol entity of the transmit end device.

Further, in step 906, when the RLC protocol entity of the transmit end device generates the TCP acknowledgment packet, in order to avoid a processing error of the TCP protocol entity of the transmit end device, that the TCP acknowledgment packet is generated by the RLC protocol entity may be indicated in the generated TCP acknowledgment packet to the TCP protocol entity of the transmit end device. For example, that a data packet is generated by the RLC protocol entity may be indicated by using a reserved bit in the data packet of the TCP acknowledgment packet; or it may be considered that all acknowledgment packets received by the TCP protocol entity of the transmit end device are constructed by the RLC protocol entity provided that both the receive end device and the transmit end device agree to use an acknowledgment packet reducing manner in this embodiment.

Further, during application of the foregoing solution, the RLC protocol entity of the transmit end device needs to record information, such as a port number corresponding to the TCP data packet, which is used to pad a data packet header when the TCP acknowledgment packet is being generated.

Further, a function of generating (constructing) a TCP acknowledgment packet and/or recording information, such as a port number corresponding to a TCP data packet, by the foregoing transmit end device may be implemented in the RLC protocol entity of the transmit end device, or may be implemented by another functional module, where the functional entity may be at an RLC layer, a PDCP layer, an IP layer, or the like, which is not limited herein. When the functional entity is a protocol entity at a layer except the RLC layer, optionally, the RLC layer needs to notify the functional entity of information about correctly receiving a TCP data packet (that is, TCP acknowledgment information carried in the sent acknowledgment packet obtained after combination).

The foregoing procedure is described by using an example in which the TCP protocol entity of the receive end device generates, after receiving the TCP data packet, a TCP acknowledgment packet to be independently sent (including only header information, but not data information). If the TCP protocol entity of the receive end device generates, after receiving the TCP data packet, a TCP acknowledgment packet piggybacked (including not only header information but also data information), a preferred implementation manner is as follows: After receiving a TCP acknowledgment packet sent by the TCP protocol entity of the receive end device, the RLC protocol entity of the receive end device sends the TCP acknowledgment packet to a peer protocol entity (that is, the TCP protocol entity) of the transmit end device, and when an RLC acknowledgment packet needs to be sent, returns an RLC acknowledgment packet for an RLC data packet received from the RLC protocol entity of the transmit end device; and the RLC protocol entity of the receive end device returns the RLC acknowledgment packet to the transmit end device after receiving the TCP acknowledgment packet.

Figure 10:
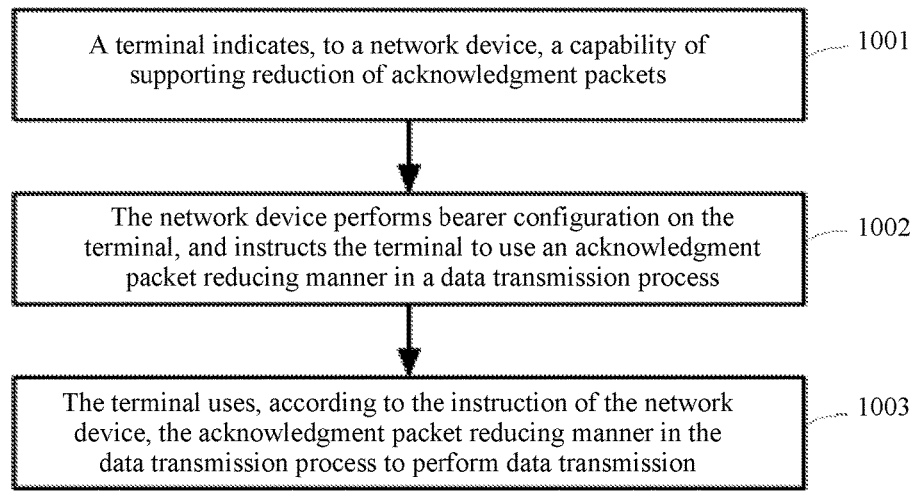
FIG. 10 is a schematic flowchart of a method for sending an acknowledgment packet according to Embodiment 6 of the present invention.

The foregoing embodiments mainly describe a data receiving acknowledgment process between a transmit end device and a receive end device, that is, how to process an RLC acknowledgment packet and a TCP acknowledgment packet in the process. In an actual application, the embodiments of the present invention may be applied to a process of data transmission between a terminal and a network-side device (for example, a base station). To improve flexibility and compatibility with the prior art, the terminal may indicate, to the network-side device, a capability of using a data acknowledgment manner described in the embodiments of the present invention. When performing bearer configuration, the network-side device instructs the terminal to use, in a data transmission process, the data acknowledgment manner described in the embodiments of the present invention; the terminal uses, in the data transmission process according to the instruction, the data receiving acknowledgment manner provided in the embodiments of the present invention to perform data transmission, so as to reduce sending of RLC acknowledgment packets and/or TCP acknowledgment packets. FIG. 10 shows an implementation process of a preferred embodiment of the foregoing procedure.

Referring to FIG. 10, FIG. 10 is a schematic diagram of a packet acknowledgment procedure according to Embodiment 6 of the present invention. The procedure may include the following steps.

Step 1001: A terminal indicates, to a network device (for example, a radio network controller), a capability of supporting reduction of acknowledgment packets.

In the step, when the terminal reports information relating to the terminal to the network device after accessing a network, the terminal may report, to the network device, the capability of the terminal of supporting reduction of acknowledgment packets. Alternatively, when requesting a transmission resource, the terminal may report, to the network device, the capability of the terminal of supporting reduction of acknowledgment packets.

Step 1002: The network device performs bearer configuration on the terminal, and instructs the terminal to use an acknowledgment packet reducing manner in a data transmission process.

Step 1003: The terminal uses, according to the instruction of the network device, the acknowledgment packet reducing manner in the data transmission process to perform data transmission, that is, uses the manner in the foregoing embodiment to perform data transmission.

Further, the network device may instruct, according to capability information reported by the terminal, the terminal to use an acknowledgment packet reducing manner in a data transmission process. For example, if the terminal indicates, to the network device, that the foregoing acknowledgment packet reducing manner provided in Embodiment 1 is supported, the network device instructs the terminal to use the acknowledgment packet reducing manner. If the terminal indicates, to the network device, that multiple acknowledgment packet reducing manners are supported, the network device may select one acknowledgment packet reducing manner for the terminal according to a policy made in advance. For example, selection may be performed according to current network transmission performance; when the network transmission performance is relatively poor, the manner provided in Embodiment 4 may be selected to reduce a sending quantity of acknowledgment packets as many as possible.

It should be noted that, in the foregoing embodiments of the present invention, preferably, when receiving a TCP layer data packet, an RLC protocol entity of a transmit end device removes some fixed information of a data packet header (for example, removes a source port number and a destination port number); after receiving the TCP data packet, an RLC protocol entity of a receive end device pads the packet header with the information. In this way, air interface transmission efficiency can be improved.

Based on a same technical concept, Embodiment 7 of the present invention provides a communications device, and the communications device may be applicable to the procedures described in the foregoing embodiments. When the communications device is applied to a communication process between user equipment and a network device, the communications device is the UE (User Equipment, user equipment), and a peer communications device is an RNC (Radio Network Control, radio network control); or the communications device is an RNC, and the peer communications device is the UE.

Figure 11:
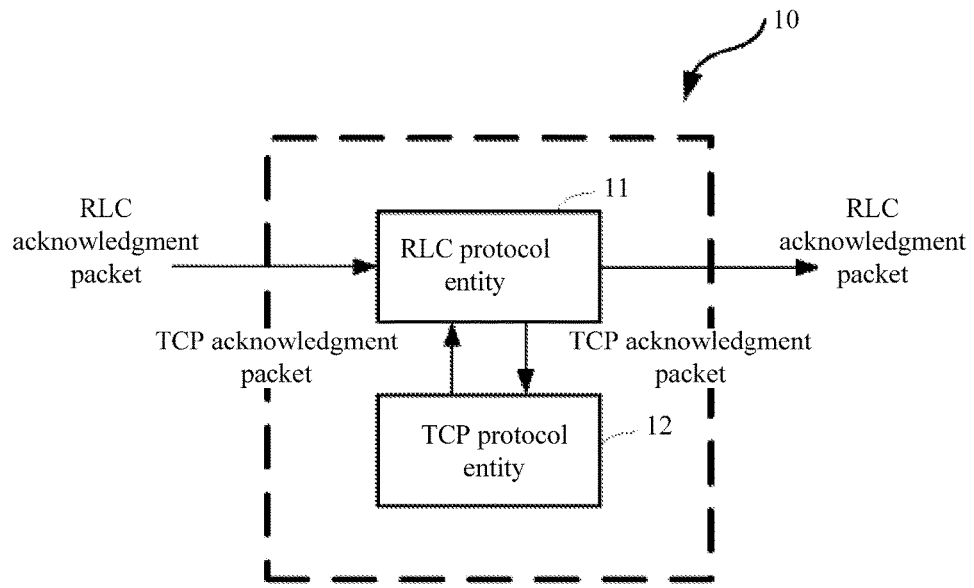
FIG. 11 is a schematic structural diagram of a communications device according to Embodiment 7 of the present invention.

Referring to FIG. 11, FIG. 11 is a schematic structural diagram of a communications device according to Embodiment 7 of the present invention. As shown in the figure, the communications device 10 may include a TCP protocol entity 11 and an RLC protocol entity 12.

The TCP protocol entity 11 is configured to: send a TCP acknowledgment packet to the RLC protocol entity 12, where the TCP acknowledgment packet is used to acknowledge that a TCP data packet sent by a peer communications device is received; and receive a TCP acknowledgment packet sent by the RLC protocol entity 12, where the TCP acknowledgment packet indicates that the peer communications device acknowledges that a corresponding TCP data packet is received.

The RLC protocol entity 12 is configured to: discard, after receiving a TCP acknowledgment packet that is sent by the TCP protocol entity 11 and does not carry data information, the received TCP acknowledgment packet; or determine, according to a sending status of an RLC acknowledgment packet, whether to send a TCP acknowledgment packet to the peer communications device, and perform corresponding processing according to a result of the determining; and send, after receiving an RLC acknowledgment packet sent by the peer communications device, a TCP acknowledgment packet to the TCP protocol entity 11 according to the received RLC acknowledgment packet if it is determined, according to the received RLC acknowledgment packet, that a TCP acknowledgment packet needs to be sent.

Further, the RLC protocol entity 12 sends an RLC acknowledgment packet to the peer communications device after receiving the TCP acknowledgment packet that is sent by the TCP protocol entity and does not carry data information and discarding the received TCP acknowledgment packet.

Specifically, the RLC protocol entity 12 is specifically configured to: if a current moment is a sending occasion of an RLC acknowledgment packet, determine not to send a TCP acknowledgment packet to the peer communications device, add TCP acknowledgment information in a currently received TCP acknowledgment packet to an RLC acknowledgment packet whose sending occasion is the current moment, and send, to the peer communications device, an RLC acknowledgment packet to which the TCP acknowledgment information is added; or if a current moment is not a sending occasion of an RLC acknowledgment packet, determine to send a TCP acknowledgment packet to the peer communications device, and send, to the peer communications device, a currently received TCP acknowledgment packet or a TCP acknowledgment packet that is obtained after information deletion is performed on the received TCP acknowledgment packet.

Specifically, the RLC protocol entity 12 is specifically configured to: determine, after receiving an RLC acknowledgment packet that is sent by an RLC protocol entity of the peer communications device and carries TCP acknowledgment information, that a TCP acknowledgment packet needs to be sent, and send a TCP acknowledgment packet to the TCP protocol entity according to the TCP acknowledgment information carried in the received RLC acknowledgment packet.

Specifically, the RLC protocol entity 12 is specifically configured to: discard a currently received TCP acknowledgment packet if it is acknowledged, according to the received TCP acknowledgment packet, that a corresponding RLC acknowledgment packet is sent; or send a currently received TCP acknowledgment packet to the peer communications device if it is acknowledged, according to the received TCP acknowledgment packet, that a corresponding RLC acknowledgment packet is not sent.

Specifically, the RLC protocol entity 12 is further configured to: if it is acknowledged that an RLC acknowledgment packet that is not sent exists in acknowledgment packets of all RLC data packets corresponding to the received TCP acknowledgment packet, skip sending the RLC acknowledgment packet that is not sent, send the received TCP acknowledgment packet to the peer communications device, and determine a next RLC acknowledgment packet according to a sequence number of an RLC data packet corresponding to the currently sent TCP acknowledgment packet.

Specifically, the RLC protocol entity 12 is specifically configured to: when a sending occasion of an RLC acknowledgment packet arrives, if the TCP acknowledgment packet that is received from the TCP protocol entity and does not carry data information is currently buffered, determine not to send a TCP acknowledgment packet to the peer communications device, add TCP acknowledgment information in the buffered TCP acknowledgment packet to an RLC acknowledgment packet that needs to be sent at a current moment, and send, to the peer communications device, an RLC acknowledgment packet to which the TCP acknowledgment information is added.

Specifically, the RLC protocol entity 12 is specifically configured to: if it is acknowledged, according to the received RLC acknowledgment packet, that a corresponding TCP data packet is correctly received, send a TCP acknowledgment packet responding to the correctly received TCP data packet to the TCP protocol entity of the communications device.

Specifically, the RLC protocol entity 12 is specifically configured to determine, according to an RLC data packet corresponding to the received RLC acknowledgment packet, and a correspondence between a TCP data packet and an RLC data packet, whether the TCP data packet corresponding to the received RLC acknowledgment packet is correctly received.

Specifically, the RLC protocol entity 12 is specifically configured to generate a TCP acknowledgment packet according to the received RLC acknowledgment packet, and send the generated TCP acknowledgment packet to the communications device.

Specifically, the TCP acknowledgment packet generated by the RLC protocol entity 12 carries indication information, which is used to indicate that the TCP acknowledgment packet is generated by the RLC protocol entity.

Based on a same technical concept, Embodiment 8 of the present invention provides a communications device. When the communications device is applied to a communication process between user equipment and a network device, the communications device is the UE, and a peer communications device is an RNC; or the communications device is an RNC, and the peer communications device is the UE.

Figure 12:
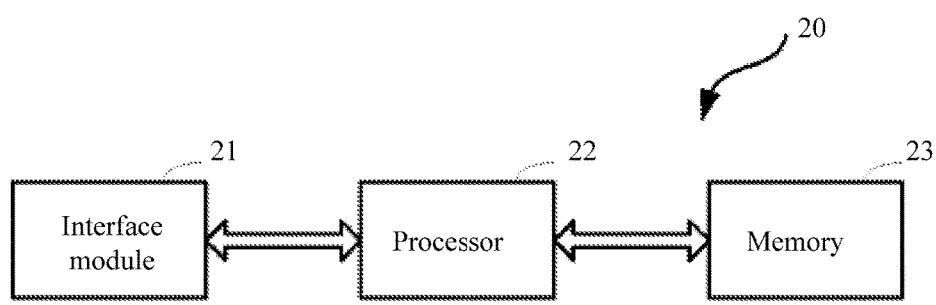
FIG. 12 is a schematic structural diagram of a communications device according to Embodiment 8 of the present invention.

Referring to FIG. 12, FIG. 12 is a schematic structural diagram of a device according to Embodiment 8 of the present invention. As shown in the figure, the communications device 20 may include: an interface module 21, a processor 22, and a memory 23, where the interface module 21 is connected to the processor 22, the processor 22 is connected to the memory 23, and a connection manner of the foregoing modules may also be a bus manner, that is, the modules exchange information by using a data bus.

The interface module 21 may be implemented by using a circuit that can perform radio signal processing; for example, the circuit may include an antenna, a radio frequency module, and the like, and is used to perform air interface communication with another communications device, including receiving and/or sending an air interface packet, such as a data packet or a protocol packet. After receiving a packet sent by another device and performing processing such as demodulation, the interface module 21 sends a packet obtained by means of demodulation to the processor 22. After receiving a packet sent by the processor 22, the interface module 21 performs processing such as modulation and sends a packet obtained by means of modulation to another communications device.

The memory 23 may be implemented by using a storage device, such as a register or a ROM, may store system data, and may also store temporary data, intermediate data, or the like generated in a process in which the processor 22 performs processing.

The processor 22 may be implemented by using a processing chip in which communications application software is installed, which is used to process transmitted data according to a protocol that is of each layer and defined in a data transmission model. According to a protocol layer defined in the data transmission model, the processor 22 may include a protocol entity (that is, a functional module) that is corresponding to each protocol layer and used to implement processing on transmitted data at a corresponding protocol layer. After receiving the packet sent by the interface module 21, the processor 22 performs protocol processing in a sequence from a bottom layer to a top layer of the protocol entities at layers in the processor 22. The processor 22 performs, in a sequence from the top layer to the bottom layer of the protocol entities at the layers in the processor 22, protocol processing on a packet that needs to be sent, and sends a processed packet to the interface module 21, so that the interface module 21 sends the processed packet. In a process of processing data, the processor 22 stores the temporary data or the intermediate data in the memory 23, so as to read, when needed, the data stored in the memory 23.

The foregoing specific implementation manners of the listed modules are merely used as examples for description, but are not intended to limit this embodiment of the present invention.

In the processor 22, protocol entities related to this embodiment of the present invention include an RLC protocol entity and a TCP protocol entity. The protocol entities shown in FIG. 11 may be installed in the processor 22, and descriptions are provided in the following.

The RLC protocol entity and the TCP protocol entity shown in FIG. 11 are installed in the processor 22, and in this case, descriptions are as follows.

The interface module 21 is configured to: receive a packet (for example, a data packet or an acknowledgment packet responding to a data packet) sent by a peer communications device, and send the packet to the processor 22; or send a packet to a peer communications device.

The processor 22 receives the data packet sent by the interface module 21, and performs protocol processing by using a corresponding protocol entity according to a protocol layer defined in the data transmission model.

The TCP protocol entity 11 in the processor 22 sends a TCP acknowledgment packet to the RLC protocol entity 12, where the TCP acknowledgment packet is used to acknowledge that a TCP data packet sent by the peer communications device is received; the TCP protocol entity 11 in the processor 22 may further receive a TCP acknowledgment packet sent by the RLC protocol entity 12, where the TCP acknowledgment packet indicates that the peer communications device acknowledges that a corresponding TCP data packet is received; and the RLC protocol entity 12 in the processor 22 discards, after receiving a TCP acknowledgment packet that is sent by the TCP protocol entity 11 and does not carry data information, the received TCP acknowledgment packet; or determines, according to a sending status of an RLC acknowledgment packet, whether to send a TCP acknowledgment packet to the peer communications device, and performs corresponding processing according to a result of the determining; and sends, after receiving an RLC acknowledgment packet (the RLC acknowledgment packet is received by using the interface module 21) sent by the peer communications device, a TCP acknowledgment packet to the TCP protocol entity 11 according to the received RLC acknowledgment packet if it is determined, according to the received RLC acknowledgment packet, that a TCP acknowledgment packet needs to be sent.

Further, the RLC protocol entity 12 sends an RLC acknowledgment packet (the RLC acknowledgment packet is sent to the peer communications device by using the interface module 21) to the peer communications device after receiving the TCP acknowledgment packet that is sent by the TCP protocol entity and does not carry data information and discarding the received TCP acknowledgment packet.

Specifically, the RLC protocol entity 12 is specifically configured to: if a current moment is a sending occasion of an RLC acknowledgment packet, determine not to send a TCP acknowledgment packet to the peer communications device, add TCP acknowledgment information in a currently received TCP acknowledgment packet to an RLC acknowledgment packet whose sending occasion is the current moment, and send, to the peer communications device, an RLC acknowledgment packet to which the TCP acknowledgment information is added (the RLC acknowledgment packet is sent to the peer communications device by using the interface module 21); or if a current moment is not a sending occasion of an RLC acknowledgment packet, determine to send a TCP acknowledgment packet to the peer communications device, and send, to the peer communications device, a currently received TCP acknowledgment packet or a TCP acknowledgment packet that is obtained after information deletion is performed on the received TCP acknowledgment packet (the TCP acknowledgment packet is sent to the peer communications device by using the interface module 21).

Specifically, the RLC protocol entity 12 is specifically configured to: determine, after receiving an RLC acknowledgment packet that is sent by an RLC protocol entity of the peer communications device and carries TCP acknowledgment information, that a TCP acknowledgment packet needs to be sent, and send a TCP acknowledgment packet to the TCP protocol entity according to the TCP acknowledgment information carried in the received RLC acknowledgment packet.

Specifically, the RLC protocol entity 12 is specifically configured to: discard a currently received TCP acknowledgment packet if it is acknowledged, according to the received TCP acknowledgment packet, that a corresponding RLC acknowledgment packet is sent; or send a currently received TCP acknowledgment packet to the peer communications device (the TCP acknowledgment packet is sent to the peer communications device by using the interface module 21) if it is acknowledged, according to the received TCP acknowledgment packet, that a corresponding RLC acknowledgment packet is not sent.

Specifically, the RLC protocol entity 12 is further configured to: if it is acknowledged that an RLC acknowledgment packet that is not sent exists in acknowledgment packets of all RLC data packets corresponding to the received TCP acknowledgment packet, skip sending the RLC acknowledgment packet that is not sent, send the received TCP acknowledgment packet to the peer communications device, and determine a next RLC acknowledgment packet according to a sequence number of an RLC data packet corresponding to the currently sent TCP acknowledgment packet.

Specifically, the RLC protocol entity 12 is specifically configured to: when a sending occasion of an RLC acknowledgment packet arrives, if the TCP acknowledgment packet that is received from the TCP protocol entity and does not carry data information is currently buffered in the memory 23, add, to an RLC acknowledgment packet that needs to be sent at a current moment, TCP acknowledgment information in the TCP acknowledgment packet buffered in the memory 23, and send, to the peer communications device, an RLC acknowledgment packet to which the TCP acknowledgment information is added.

Specifically, the RLC protocol entity 12 is specifically configured to: if it is acknowledged, according to the received RLC acknowledgment packet, that a corresponding TCP data packet is correctly received, send a TCP acknowledgment packet responding to the correctly received TCP data packet to the TCP protocol entity of the communications device 20 (the TCP acknowledgment packet is sent to the peer communications device 20 by using the interface module 21).

Specifically, the RLC protocol entity 12 is specifically configured to determine, according to an RLC data packet corresponding to the received RLC acknowledgment packet, and a correspondence between a TCP data packet and an RLC data packet, whether the TCP data packet corresponding to the received RLC acknowledgment packet is correctly received.

Specifically, the RLC protocol entity 12 is specifically configured to generate a TCP acknowledgment packet according to the received RLC acknowledgment packet, and send the generated TCP acknowledgment packet to the communications device.

Specifically, the TCP acknowledgment packet generated by the RLC protocol entity 12 carries indication information, which is used to indicate that the TCP acknowledgment packet is generated by the RLC protocol entity.

Figure 13:
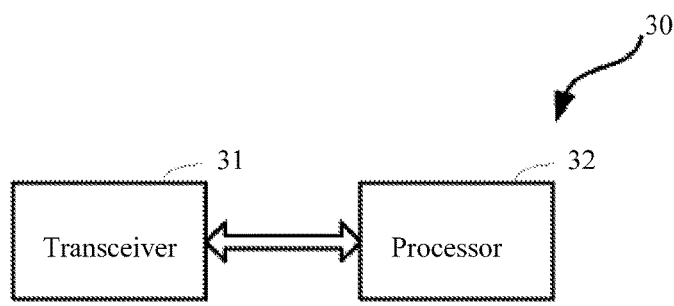
FIG. 13 is a schematic structural diagram of a communications device according to Embodiment 9 of the present invention.

Based on a same technical concept, Embodiment 9 of the present invention provides a communications device. When the communications device is applied to a communication process between user equipment and a network device, the communications device is the UE, and a peer communications device is an RNC; or the communications device is an RNC, and the peer communications device is the UE. As shown in FIG. 13, the communications device 30 may include a transceiver 31 and a processor 32.

The transceiver 31 is configured to: send a TCP acknowledgment packet to the processor 32, where the TCP acknowledgment packet is used to acknowledge that a TCP data packet sent by a peer communications device is received; and receive a TCP acknowledgment packet sent by the processor 32, where the TCP acknowledgment packet indicates that the peer communications device acknowledges that a corresponding TCP data packet is received.

The processor 32 is configured to: discard, after receiving a TCP acknowledgment packet that is sent by the transceiver 31 and does not carry data information, the received TCP acknowledgment packet; or determine, according to a sending status of an RLC acknowledgment packet, whether to send a TCP acknowledgment packet to the peer communications device, and perform corresponding processing according to a result of the determining.

The processor 32 is further configured to send, after receiving an RLC acknowledgment packet sent by the peer communications device, a TCP acknowledgment packet to the transceiver 31 according to the received RLC acknowledgment packet if the processor 32 determines, according to the received RLC acknowledgment packet, that a TCP acknowledgment packet needs to be sent.

Further, the processor 32 is further configured to send an RLC acknowledgment packet to the peer communications device after receiving the TCP acknowledgment packet that is sent by the transceiver 31 and does not carry data information and discarding the received TCP acknowledgment packet.

Specifically, the processor 32 is specifically configured to: if a current moment is a sending occasion of an RLC acknowledgment packet, add TCP acknowledgment information in a currently received TCP acknowledgment packet to an RLC acknowledgment packet whose sending occasion is the current moment, and send, to the peer communications device 31, an RLC acknowledgment packet to which the TCP acknowledgment information is added; or if a current moment is not a sending occasion of an RLC acknowledgment packet, send, to the peer communications device 31, a currently received TCP acknowledgment packet or a TCP acknowledgment packet that is obtained after information deletion is performed on the received TCP acknowledgment packet.

Specifically, the processor 32 is specifically configured to: determine, after receiving an RLC acknowledgment packet that is sent by the peer communications device and carries TCP acknowledgment information, that a TCP acknowledgment packet needs to be sent, and send a TCP acknowledgment packet to the transceiver 31 according to the TCP acknowledgment information carried in the received RLC acknowledgment packet.

Specifically, the processor 32 is specifically configured to: discard a currently received TCP acknowledgment packet if it is acknowledged, according to the received TCP acknowledgment packet, that a corresponding RLC acknowledgment packet is sent; or send a currently received TCP acknowledgment packet to the peer communications device 31 if it is acknowledged, according to the received TCP acknowledgment packet, that a corresponding RLC acknowledgment packet is not sent.

Further, the processor 32 is further configured to: if it is acknowledged that an RLC acknowledgment packet that is not sent exists in acknowledgment packets of all RLC data packets corresponding to the received TCP acknowledgment packet, skip sending the RLC acknowledgment packet that is not sent, send the received TCP acknowledgment packet to the peer communications device 31, and determine a next RLC acknowledgment packet according to a sequence number of an RLC data packet corresponding to the currently sent TCP acknowledgment packet.

Specifically, the processor 32 is specifically configured to: when a sending occasion of an RLC acknowledgment packet arrives, if the TCP acknowledgment packet that is received from the transceiver 31 and does not carry data information is currently buffered, add TCP acknowledgment information in the buffered TCP acknowledgment packet to an RLC acknowledgment packet that needs to be sent at a current moment, and send, to the peer communications device 31, an RLC acknowledgment packet to which the TCP acknowledgment information is added.

Specifically, the processor 32 is specifically configured to: if it is acknowledged, according to the received RLC acknowledgment packet, that a corresponding TCP data packet is correctly received, send a TCP acknowledgment packet responding to the correctly received TCP data packet to the transceiver of the communications device 31.

Specifically, the processor 32 is specifically configured to determine, according to an RLC data packet corresponding to the received RLC acknowledgment packet, and a correspondence between a TCP data packet and an RLC data packet, whether the TCP data packet corresponding to the received RLC acknowledgment packet is correctly received.

Specifically, the processor 32 is specifically configured to generate a TCP acknowledgment packet according to the received RLC acknowledgment packet, and send the generated TCP acknowledgment packet to the communications device 31.

Specifically, the TCP acknowledgment packet generated by the processor 32 carries indication information, which is used to indicate that the TCP acknowledgment packet is generated by the processor.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art may make various modifications and variations to the embodiments of the present invention without departing from the spirit and scope of the embodiments of the present invention. The present invention is intended to cover these modifications and variations of the embodiments of the present invention provided that they fall within the scope of protection defined by the following claims of the present invention and their equivalent technologies.

What is claimed is:

1. A non-transitory machine-readable medium having stored thereon, a computer program comprising at least one code section for distributing data, the at least one code section being executable by one or more processors, and when executed, causes the one or more processors to:
   receive at least one data packet from a peer communications device;
   send a first transfer control protocol (TCP) acknowledgment packet in response to the at least one data packet;
   when the first TCP acknowledgment packet does not carry data information, discard the first TCP acknowledgment packet; and
   when the first TCP acknowledgment packet does carry data information, determine, according to a sending status of a first radio link control (RLC) acknowledgment packet sent by a second processor, whether to send the first TCP acknowledgment packet to the peer communications device, and perform corresponding processing according to a result of the determining whether to send the first TCP acknowledgment packet to the peer communications device, including:
     when a current moment is a sending occasion of the first RLC acknowledgment packet, determine not to send the first TCP acknowledgment packet to the peer communications device, add first TCP acknowledgment information in the first TCP acknowledgment packet to the first RLC acknowledgment packet whose sending occasion is the current moment, and send, to the peer communications device, the first RLC acknowledgment packet to which the first TCP acknowledgment information is added; or
     when a current moment is not a sending occasion of the first RLC acknowledgment packet, determine to send the first TCP acknowledgment packet to the peer communications device, and send, to the peer communications device, the first TCP acknowledgment packet or the first TCP acknowledgment packet that is obtained after information deletion is performed on the first TCP acknowledgment packet,
   wherein the RCL acknowledgment packet includes a protocol data unit (PDU) Type field that indicates that the RLC acknowledgment packet includes TCP acknowledgment information, a superfield (SUFI) field that is used to carry RLC layer acknowledgment information, and padding information; and
   after at least one data packet is sent to the peer communications device, receive a second RLC acknowledgment packet sent by the peer communications device, and send a second TCP acknowledgment packet according to the second RLC acknowledgment packet when it is determined, according to the second RLC acknowledgment packet, that the second TCP acknowledgment packet needs to be sent.

2. The non-transitory machine-readable medium according to claim 1, wherein the at least one code section when executed further causes the one or more processors to:
   when the TCP acknowledgement packet does not carry data information, send a first RLC acknowledgment packet to the peer communications device after the first TCP acknowledgment packet is discarded.

3. The non-transitory machine-readable medium according to claim 1, wherein the at least one code section when executed further causes the one or more processors to:
   discard the first TCP acknowledgment packet when it is acknowledged, according to the first TCP acknowledgment packet, that the first RLC acknowledgment packet is sent; and
   send the first TCP acknowledgment packet to the peer communications device when it is acknowledged, according to the first TCP acknowledgment packet, that the first RLC acknowledgment packet is not sent.

4. The non-transitory machine-readable medium according to claim 3, wherein the at least one code section when executed further causes the one or more processors to:
   when it is acknowledged that the first RLC acknowledgment packet that is not sent exists in acknowledgment packets of all RLC data packets corresponding to the first TCP acknowledgment packet, not send the first RLC acknowledgment packet;
   send the first TCP acknowledgment packet to the peer communications device; and
   determine a next RLC acknowledgment packet according to a sequence number of a RLC data packet corresponding to the first TCP acknowledgment packet.

5. The non-transitory machine-readable medium according to claim 1, wherein the at least one code section when executed further causes the one or more processors to:
when a sending occasion of the first RLC acknowledgment packet arrives, when the first TCP acknowledgment packet is received and does not carry data information is currently buffered, determine not to send the first TCP acknowledgment packet to the peer communications device;
add TCP acknowledgment information in the buffered first TCP acknowledgment packet to the first RLC acknowledgment packet that needs to be sent at a current moment; and
send, to the peer communications device, the first RLC acknowledgment packet to which the TCP acknowledgment information is added.

6. The non-transitory machine-readable medium according to claim 1, wherein the at least one code section when executed further causes the one or more processors to:
when it is acknowledged, according to the second RLC acknowledgment packet, that a corresponding TCP data packet is correctly received, send the second TCP acknowledgment packet responding to the correctly received TCP data packet.

7. The non-transitory machine-readable medium according to claim 6, wherein the at least one code section when executed further causes the one or more processors to:
determine, according to a RLC data packet corresponding to the second RLC acknowledgment packet, and a correspondence between a TCP data packet and a RLC data packet, whether the TCP data packet corresponding to the second RLC acknowledgment packet is correctly received.

8. The non-transitory machine-readable medium according to claim 1, wherein the at least one code section when executed further causes the one or more processors to:
generate the second TCP acknowledgment packet according to the second RLC acknowledgment packet, and
send the generated second TCP acknowledgment packet.

9. The non-transitory machine-readable medium according to claim 8, wherein the second TCP acknowledgment packet carries indication information for indicating that the second TCP acknowledgment packet is generated.

10. An apparatus, comprising at least one processor coupled with a non-transitory storage medium storing executable instructions; wherein the executable instructions, when executed by the processor, cause the apparatus to:
receive at least one data packet from a peer communications device;
send a first transfer control protocol (TCP) acknowledgment packet in response to the at least one data packet;
when the first TCP acknowledgment packet does not carry data information, discard the first TCP acknowledgment packet; and
when the first TCP acknowledgment packet does carry data information, determine, according to a sending status of a first radio link protocol (RLC) acknowledgment packet sent by a second processor, whether to send the first TCP acknowledgment packet to the peer communications device, and perform corresponding processing according to a result of the determining whether to send the first TCP acknowledgment packet to the peer communications device, including:
when a current moment is a sending occasion of the first RLC acknowledgment packet, determine not to send the first TCP acknowledgment packet to the peer communications device, add first TCP acknowledgment information in the first TCP acknowledgment packet to the first RLC acknowledgment packet whose sending occasion is the current moment, and send, to the peer communications device, the first RLC acknowledgment packet to which the first TCP acknowledgment information is added; or
when a current moment is not a sending occasion of the first RLC acknowledgment packet, determine to send the first TCP acknowledgment packet to the peer communications device, and send, to the peer communications device, the first TCP acknowledgment packet or the first TCP acknowledgment packet that is obtained after information deletion is performed on the first TCP acknowledgment packet,
wherein the RCL acknowledgment packet includes a protocol data unit (PDU) Type field that indicates that the RLC acknowledgment packet includes TCP acknowledgment information, a superfield (SUFI) field that is used to carry RLC layer acknowledgment information, and padding information; and
after the at least one data packet is sent to the peer communications device, receive a second RLC acknowledgment packet sent by the peer communications device, and send a second TCP acknowledgment packet according to the second RLC acknowledgment packet when it is determined, according to the second RLC acknowledgment packet, that the second TCP acknowledgment packet needs to be sent.

11. The apparatus according to claim 10, wherein the at least one processor is further configured to, when the TCP acknowledgement packet does not carry data information, send a first RLC acknowledgment packet to the peer communications device after discarding the first TCP acknowledgment packet.

12. The apparatus according to claim 10, wherein the executable instructions, when executed by the processor, cause the apparatus to:
discard the first TCP acknowledgment packet when it is acknowledged, according to the first TCP acknowledgment packet, that the first RLC acknowledgment packet is sent; and
send the first TCP acknowledgment packet to the peer communications device when it is acknowledged, according to the first TCP acknowledgment packet, that the first RLC acknowledgment packet is not sent.

13. The apparatus according to claim 12, wherein the executable instructions, when executed by the processor, cause the apparatus to:
when it is acknowledged that the first RLC acknowledgment packet that is not sent exists in acknowledgment packets of all RLC data packets corresponding to the first TCP acknowledgment packet, do not send the first RLC acknowledgment packet;
send the first TCP acknowledgment packet to the peer communications device; and
determine a next RLC acknowledgment packet according to a sequence number of a RLC data packet corresponding to the first TCP acknowledgment packet.

14. The apparatus according to claim 10, wherein the executable instructions, when executed by the processor, cause the apparatus to:
when a sending occasion of the first RLC acknowledgment packet arrives, when the first TCP acknowledgment packet is received and does not carry data information is currently buffered, determine not to send the first TCP acknowledgment packet to the peer communications device;

add TCP acknowledgment information in the buffered first TCP acknowledgment packet to the first RLC acknowledgment packet that needs to be sent at a current moment; and send, to the peer communications device, the first RLC acknowledgment packet to which the TCP acknowledgment information is added.

15. The apparatus according to claim 10, wherein the executable instructions, when executed by the processor, cause the apparatus to:

if it is acknowledged, according to the second RLC acknowledgment packet, that a corresponding TCP data packet is correctly received, send the second TCP acknowledgment packet responding to the correctly received TCP data packet.

16. The apparatus according to claim 15, wherein the at least one processor is further configured to determine, according to a RLC data packet corresponding to the second RLC acknowledgment packet, and a correspondence between a TCP data packet and a RLC data packet, whether the TCP data packet corresponding to the second RLC acknowledgment packet is correctly received.

17. The apparatus according to claim 10, wherein the executable instructions, when executed by the processor, cause the apparatus to:

generate the second TCP acknowledgment packet according to the second RLC acknowledgment packet; and send the generated second TCP acknowledgment packet.

18. The apparatus according to claim 17, wherein the second TCP acknowledgment packet carries indication information for indicating that the second TCP acknowledgment packet is generated.

19. An apparatus for communicating with a peer communications device, the apparatus comprising:

a transmitter;

a receiver configured to receive at least one data packet from the peer communications device;

a first processor configured to send a first transfer control protocol (TCP) acknowledgment packet to a second processor in response to the at least one data packet;

wherein the second processor is configured to:

when the first TCP acknowledgment packet does not carry data information, discard the first TCP acknowledgment packet, and when the first TCP acknowledgment packet does carry data information, determine, according to a sending status of a first radio link protocol (RLC) acknowledgment packet sent by the second processor of the communications device, whether to send the first TCP acknowledgment packet to the peer communications device, and perform corresponding processing according to a result of the determining whether to send the first TCP acknowledgment packet to the peer communications device, including:

when a current moment is a sending occasion of the first RLC acknowledgment packet, determine not to send the first TCP acknowledgment packet to the peer communications device, and add first TCP acknowledgment information in the first TCP acknowledgment packet to the first RLC acknowledgment packet whose sending occasion is the current moment, and wherein the transmitter is configured to send, to the peer communications device, the first RLC acknowledgment packet to which the first TCP acknowledgment information is added; or when a current moment is not a sending occasion of the first RLC acknowledgment packet, determine to send the first TCP acknowledgment packet to the peer communications device, and wherein the transmitter is configured to send, to the peer communications device, the first TCP acknowledgment packet or the first TCP acknowledgment packet that is obtained after information deletion is performed on the first TCP acknowledgment packet, wherein the RCL acknowledgment packet includes a protocol data unit (PDU) Type field that indicates that the RLC acknowledgment packet includes TCP acknowledgment information, a superfield (SUFI) field that is used to carry RLC layer acknowledgment information, and padding information; and wherein after the transmitter sends at least one data packet to the peer communications device, the receiver is further configured to receive a second RLC acknowledgment packet sent by the peer communications device, and the second processor is further configured to send a second TCP acknowledgment packet to the first processor according to the second RLC acknowledgment packet when it is determined, according to the second RLC acknowledgment packet, that the second TCP acknowledgment packet needs to be sent.

20. The apparatus according to claim 19, wherein, when the TCP acknowledgement packet does not carry data information, the transmitter is further configured to send a first RLC acknowledgment packet to the peer communications device after discarding the first TCP acknowledgment packet.

* * * * *